(12) United States Patent
Kondo et al.

(10) Patent No.: US 9,568,711 B2
(45) Date of Patent: Feb. 14, 2017

(54) IMAGING LENS AND IMAGING APPARATUS EQUIPPED WITH THE IMAGING LENS

(71) Applicant: FUJIFILM Corporation, Tokyo (JP)

(72) Inventors: Masato Kondo, Saitama-ken (JP); Michio Cho, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 69 days.

(21) Appl. No.: 14/633,448

(22) Filed: Feb. 27, 2015

(65) Prior Publication Data

US 2015/0168690 A1 Jun. 18, 2015

Related U.S. Application Data

(63) Continuation of application No. PCT/JP2013/004715, filed on Aug. 5, 2013.

(60) Provisional application No. 61/701,189, filed on Sep. 14, 2012.

(30) Foreign Application Priority Data

Aug. 29, 2012 (JP) ................. 2012-188270

(51) Int. Cl.
*G02B 3/02* (2006.01)
*G02B 21/02* (2006.01)
*G02B 13/02* (2006.01)
*G02B 9/60* (2006.01)
*G02B 13/00* (2006.01)
*H04N 5/225* (2006.01)

(52) U.S. Cl.
CPC ............. *G02B 13/0045* (2013.01); *G02B 9/60* (2013.01); *H04N 5/2254* (2013.01)

(58) Field of Classification Search
CPC ......... G02B 13/18; G02B 21/02; G02B 13/00; G02B 13/02; G02B 13/04; G02B 9/60; G02B 13/08; G02B 3/00; G02B 13/0045
USPC ....... 359/714, 708, 660, 713, 733, 745, 746, 359/752, 753, 775, 763, 764, 756, 359/757, 658–659, 671, 642, 362
See application file for complete search history.

(56) References Cited

U.S. PATENT DOCUMENTS

| | | |
|---|---|---|
| 8,305,697 B1 | 11/2012 | Chen et al. |
| 8,369,027 B2 | 2/2013 | Hsu et al. |
| 8,411,376 B2 | 4/2013 | Kubota |
| 8,917,457 B2 | 12/2014 | Matsusaka et al. |
| 2010/0220229 A1 | 9/2010 | Sano |
| 2011/0134305 A1 | 6/2011 | Sano et al. |
| 2011/0249346 A1 | 10/2011 | Tang et al. |

(Continued)

FOREIGN PATENT DOCUMENTS

| | | |
|---|---|---|
| CN | 201903684 | 7/2011 |
| CN | 202141850 | 2/2012 |

(Continued)

OTHER PUBLICATIONS

International Search Report PCT/JP2013/004715 dated Nov. 26, 2013.

*Primary Examiner* — Dawayne A Pinkney
(74) *Attorney, Agent, or Firm* — Young & Thompson

(57) ABSTRACT

An imaging lens is essentially constituted by five lenses, including: a first lens of a biconvex shape; a second lens of a meniscus shape having a concave surface toward the image side; a third lens of a biconcave shape; a fourth lens of a meniscus shape having a convex surface toward the image side; and a fifth lens of a biconcave shape having at (Continued)

EXAMPLE 1 least one inflection point on the surface thereof toward the image side, provided in this order from the object side.

15 Claims, 12 Drawing Sheets

(56) References Cited

U.S. PATENT DOCUMENTS

| | | |
|---|---|---|
| 2012/0105704 A1 | 5/2012 | Huang et al. |
| 2012/0162784 A1 | 6/2012 | Tang et al. |
| 2013/0021679 A1* | 1/2013 | Tsai .................. G02B 13/0045 359/714 |
| 2013/0279022 A1 | 10/2013 | Tang et al. |

FOREIGN PATENT DOCUMENTS

| | | |
|---|---|---|
| CN | 202166775 | 3/2012 |
| JP | 2010-152042 | 7/2010 |
| JP | 2010-224521 | 10/2010 |
| TW | 201234068 | 8/2012 |
| WO | 2010024198 | 3/2010 |
| WO | 2011118554 | 9/2011 |

* cited by examiner

EXAMPLE 1

REFERENCE EXAMPLE 2

EXAMPLE 4

REFERENCE EXAMPLE 5

IMAGING LENS AND IMAGING APPARATUS EQUIPPED WITH THE IMAGING LENS

CROSS REFERENCE TO RELATED APPLICATIONS

The present application is a Continuation of PCT International Application No. PCT/JP2013/004715 filed on Aug. 5, 2013, which claims priority under 35 U.S.C. §119(a) to Japanese Patent Application No. 2012-188270 filed on Aug. 29, 2012, and U.S. Provisional Patent Application No. 61/701,189 filed on Sep. 14, 2012. Each of the above applications is hereby expressly incorporated by reference, in its entirety, into the present application.

BACKGROUND OF THE INVENTION

Technical Field

The present invention is related to a fixed focus imaging lens for forming optical images of subjects onto an imaging element such as a CCD (Charge Coupled Device) and a CMOS (Complementary Metal Oxide Semiconductor). The present invention is also related to an imaging apparatus provided with the imaging lens that performs photography such as a digital still camera, a cellular telephone with a built in camera, a PDA (Personal Digital Assistant), a smart phone, a tablet type terminal, and a portable gaming device.

Background Art

Accompanying the recent spread of personal computers in households, digital still cameras capable of inputting image data such as photographed scenes and portraits into personal computers are rapidly becoming available. In addition, many cellular telephones, smart phones, and tablet type terminals are being equipped with camera modules for inputting images. Imaging elements such as CCD's and CMOS's are employed in these devices having photography functions. Recently, miniaturization of these imaging elements is advancing, and there is demand for miniaturization of the entirety of the photography devices as well as imaging lenses to be mounted thereon. At the same time, the number of pixels in imaging elements is increasing, and there is demand for high resolution and high performance of imaging lenses. Performance corresponding to 5 megapixels or greater, and more preferably 8 megapixels or greater, is desired.

In response to such demands, imaging lenses having a five lens configuration, which is a comparatively large number of lenses, may be considered. For example, Chinese Utility Model Publication No. 201903684, International Patent Publication No. 2011/118554, and Japanese Unexamined Patent Publication No. 2010-152042 propose imaging lenses, each of which is constituted by: a first lens having a positive refractive power, a second lens having a negative refractive power, a third lens having a negative refractive power, a fourth lens having a positive refractive power, and a fifth lens having a negative refractive power, provided in this order from the object side.

DISCLOSURE OF THE INVENTION

Here, in imaging lenses constituted by a comparatively large number of lenses and in which shortened total lengths are required to be employed particularly in portable terminals, there is demand for an imaging lens having an even smaller F number and an image size which is sufficiently large to be compatible with imaging elements of approximately the same size as those which had been conventionally utilized, in order to be able to be compatible with a desired resolution, to be realized.

The imaging lenses disclosed in Chinese Utility Model Publication No. 201903684 and International Patent Publication No. 2011/118554 having the five lens configurations do not sufficiently correct aberration or do not have sufficiently small F numbers in order to meet all of these demands. That is, realization of both a smaller F number and further improved performance is required in these imaging lenses. The lens disclosed in Japanese Unexamined Patent Publication No. 2010-152042 does not sufficiently correct aberration, and therefore further improved performance is required.

The present invention has been developed in view of the foregoing points. The object of the present invention is to provide an imaging lens that has a small F number while maintaining a sufficiently large image size that enables realization of a desired resolution, a shortened total length, and high imaging performance from a central angle of view to peripheral angles of view. It is another object of the present invention to provide an imaging apparatus equipped with the lens, which is capable of obtaining high resolution photographed images.

An imaging lens of the present invention consists essentially of five lenses, including:

a first lens of a biconvex shape;

a second lens of a meniscus shape having a concave surface toward the image side;

a third lens of a biconcave shape;

a fourth lens of a meniscus shape having a convex surface toward the image side; and a fifth lens of a biconcave shape having at least one inflection point on the surface thereof toward the image side, provided in this order from the object side;

the imaging lens satisfying the conditional formulae below:

$$1.45 \leq f/f1 < 3 \qquad (1\text{-}3)$$

$$-0.6 < f/f3 \leq -0.24 \qquad (2\text{-}2)$$

wherein f is the focal length of the entire system, f1 is the focal length of the first lens, and f3 is the focal length of the third lens.

According to the imaging lens of the present invention, the configuration of each lens element is optimized within a lens configuration having five lenses as a whole. Therefore, a lens system that has a short total length while having high resolution performance can be realized.

Note that in the imaging lens of the present invention, the expression "consists essentially of five lenses" means that the imaging lens of the present invention may also include lenses that practically have no power, optical elements other than lenses such as a stop and a cover glass, and mechanical components such as lens flanges, a lens barrel, a camera shake correcting mechanism, etc., in addition to the five lenses. In addition, the shapes of the surfaces and the signs of the refractive powers of the lenses will be considered as those in the paraxial region for lenses that include aspherical surfaces.

The optical performance of the imaging lens of the present invention can be further improved by adopting the following favorable configurations.

In the imaging lens of the present invention, it is preferable for the second lens to have a negative refractive power.

In the imaging lens of the present invention, it is preferable for the fourth lens to have a positive refractive power.

It is preferable for the imaging lens of the present invention to satisfy one of Conditional Formulae (1-4) through (6-1) below. Note that as a preferable aspect of the present invention, the imaging lens of the present invention may satisfy any one or arbitrary combinations of Conditional Formulae (1-4) through (6-1).

$$1.45 \leq f/f1 < 2.5 \qquad (1\text{-}4)$$

$$1.45 \leq f/f1 < 2.2 \qquad (1\text{-}5)$$

$$-0.5 < f/f3 \leq -0.24 \qquad (2\text{-}3)$$

$$-3 < f/f5 < -1.2 \qquad (3)$$

$$-2.5 < f/f5 < -1.3 \qquad (3\text{-}1)$$

$$-2 < f/f2 < -0.4 \qquad (4)$$

$$-1.5 < f/f2 < -0.5 \qquad (4\text{-}1)$$

$$1 < f/f4 < 2.5 \qquad (5)$$

$$1.1 < f/f4 < 2.3 \qquad (5\text{-}1)$$

$$vd3 < 30 \qquad (6)$$

$$vd3 < 26 \qquad (6\text{-}1)$$

wherein f1 is the focal length of the first lens, f2 is the focal length of the second lens, f3 is the focal length of the third lens, f4 is the focal length of the fourth lens, f5 is the focal length of the fifth lens, and vd3 is the Abbe's number of the third lens with respect to the d line.

An imaging apparatus of the present invention is equipped with the imaging lens of the present invention.

The imaging apparatus of the present invention is capable of obtaining high resolution image signals, based on high resolution optical images obtained by the imaging lens of the present invention.

According to the imaging lens of the present invention, the configuration of each lens element is optimized within a lens configuration having five lenses as a whole, and the shapes of the first lens and the fifth lens are favorably configured in particular. Therefore, a lens system having a small F number, a short total length, and a large image size, and further, high imaging performance from a central angle of view to peripheral angles of view, can be realized.

The imaging apparatus of the present invention outputs image signals corresponding to optical images formed by the imaging lens of the present invention having high imaging performance. Therefore, the imaging apparatus of the present invention is capable of obtaining high resolution photographed images.

Figure 7:
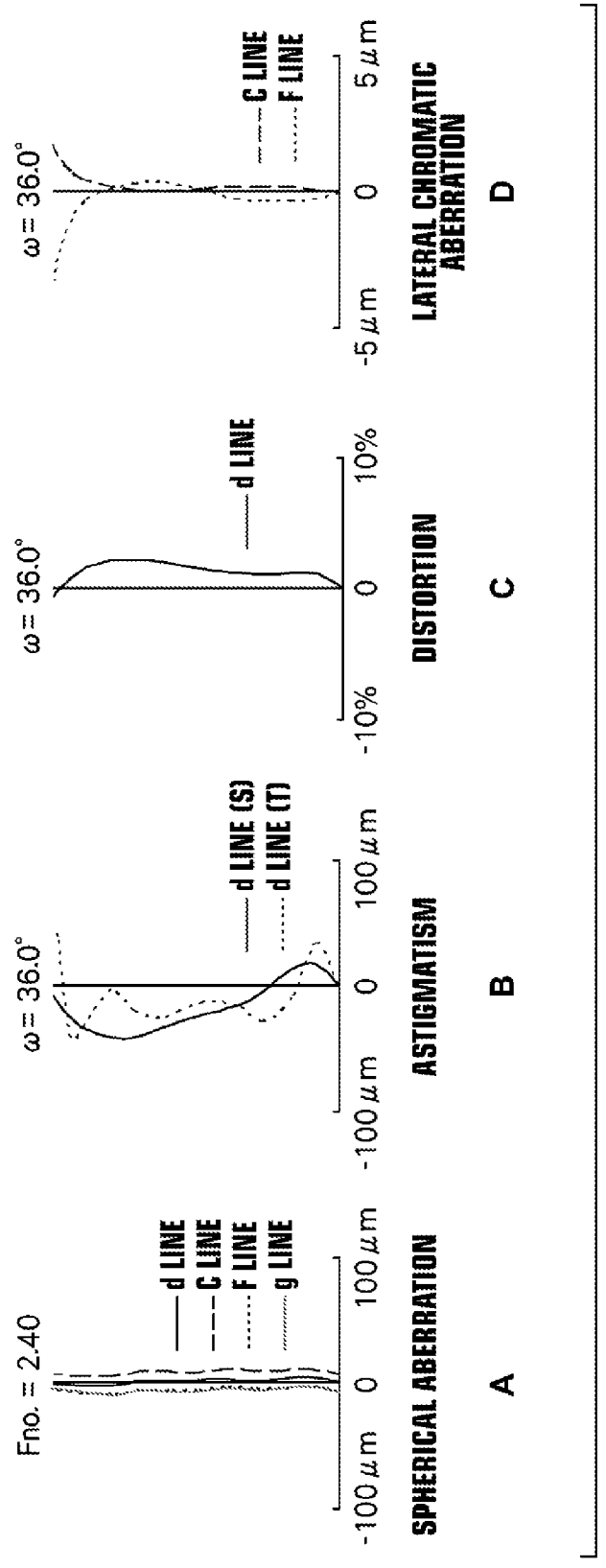

A through D of FIG. 7 are diagrams that illustrate aberrations of the imaging lens of Example 1, wherein A illustrates spherical aberration, B illustrates astigmatism (field curvature), C illustrates distortion, and D illustrates lateral chromatic aberration.

Figure 8:
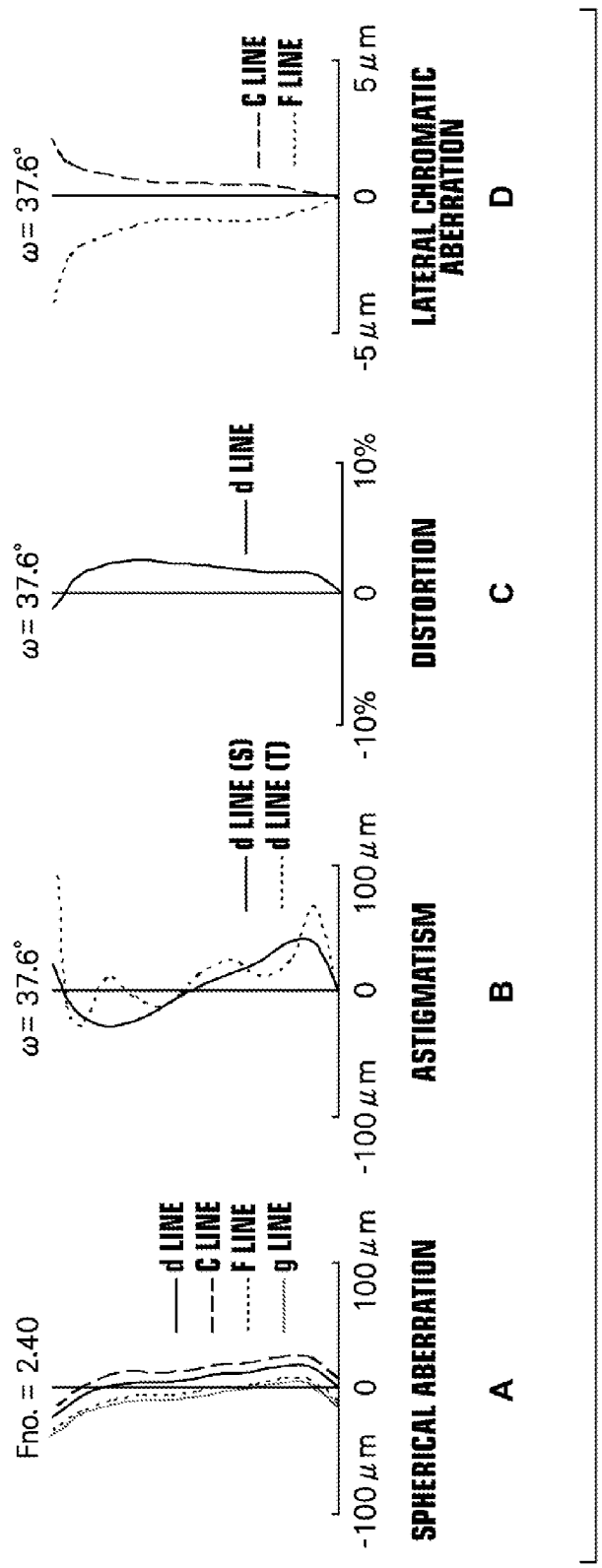

A through D of FIG. 8 are diagrams that illustrate aberrations of the imaging lens of Reference Example 2, wherein A illustrates spherical aberration, B illustrates astigmatism (field curvature), C illustrates distortion, and D illustrates lateral chromatic aberration.

Figure 9:
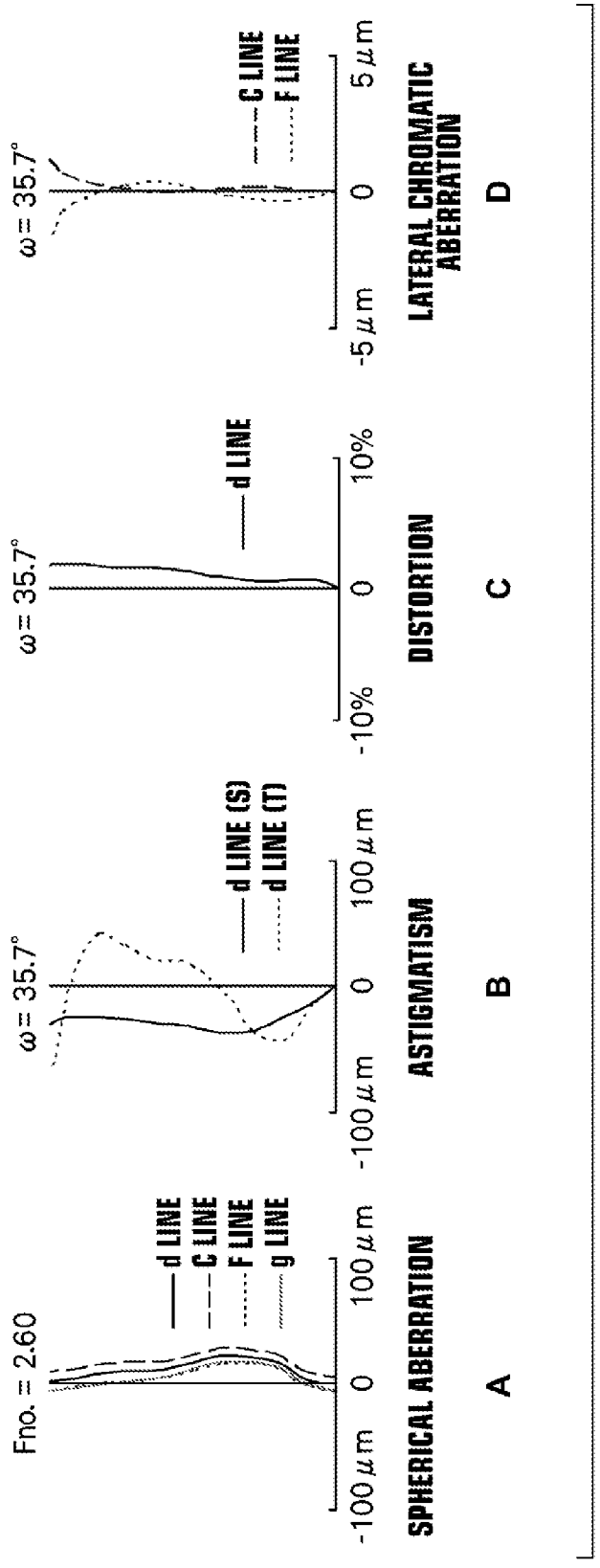

A through D of FIG. 9 are diagrams that illustrate aberrations of the imaging lens of Example 3, wherein A illustrates spherical aberration, B illustrates astigmatism (field curvature), C illustrates distortion, and D illustrates lateral chromatic aberration.

Figure 10:
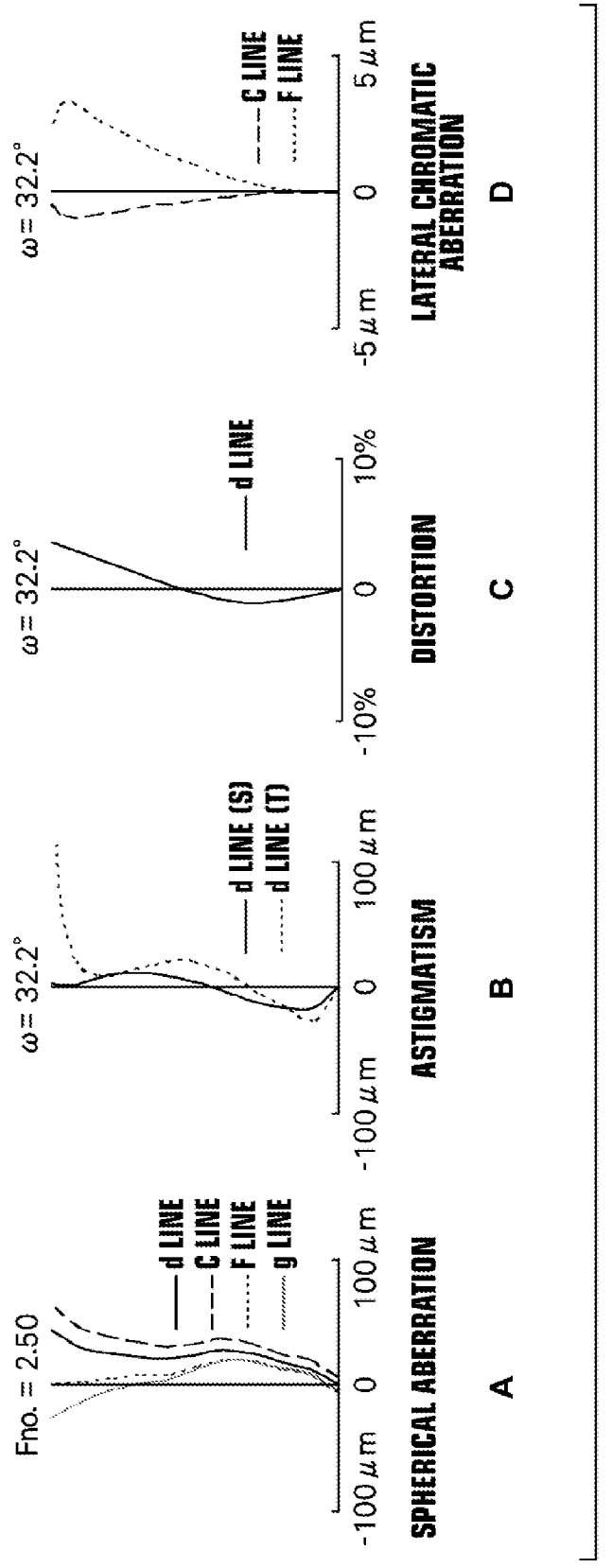

A through D of FIG. 10 are diagrams that illustrate aberrations of the imaging lens of Example 4, wherein A illustrates spherical aberration, B illustrates astigmatism (field curvature), C illustrates distortion, and D illustrates lateral chromatic aberration.

Figure 11:
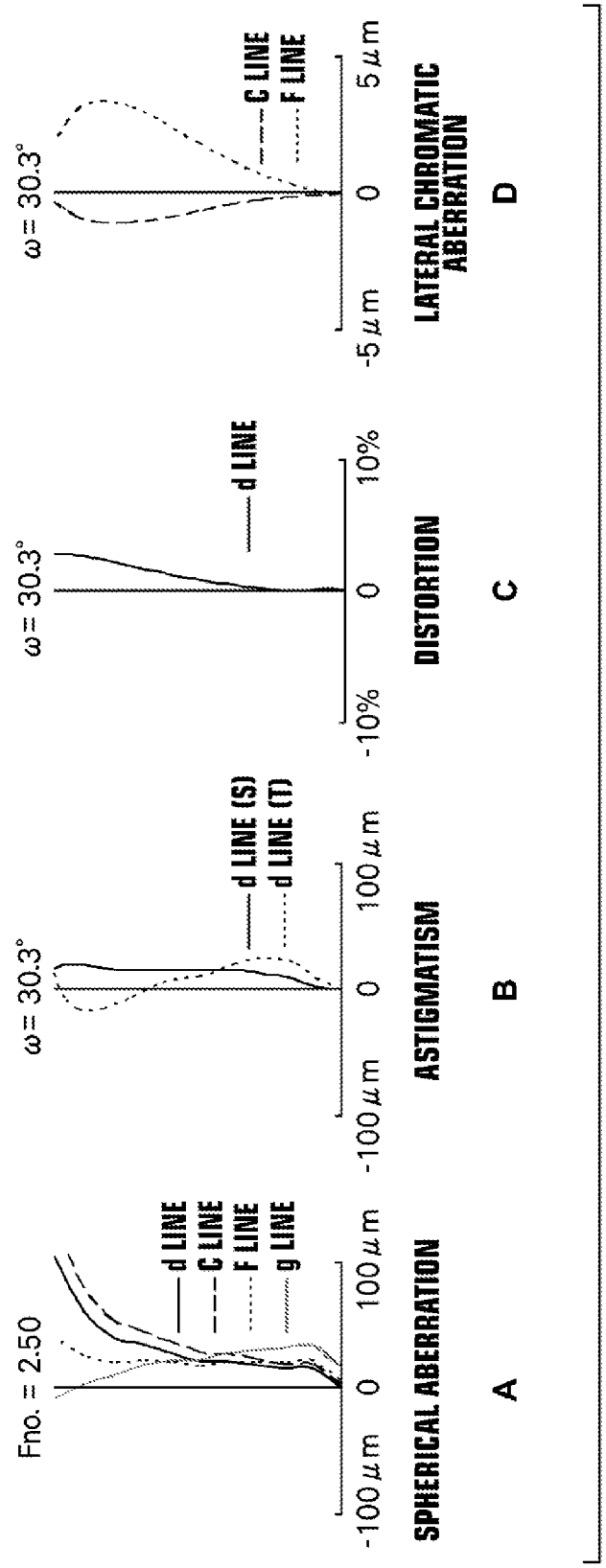

A through D of FIG. 11 are diagrams that illustrate aberrations of the imaging lens of Reference Example 5, wherein A illustrates spherical aberration, B illustrates astigmatism (field curvature), C illustrates distortion, and D illustrates lateral chromatic aberration.

Figure 12:
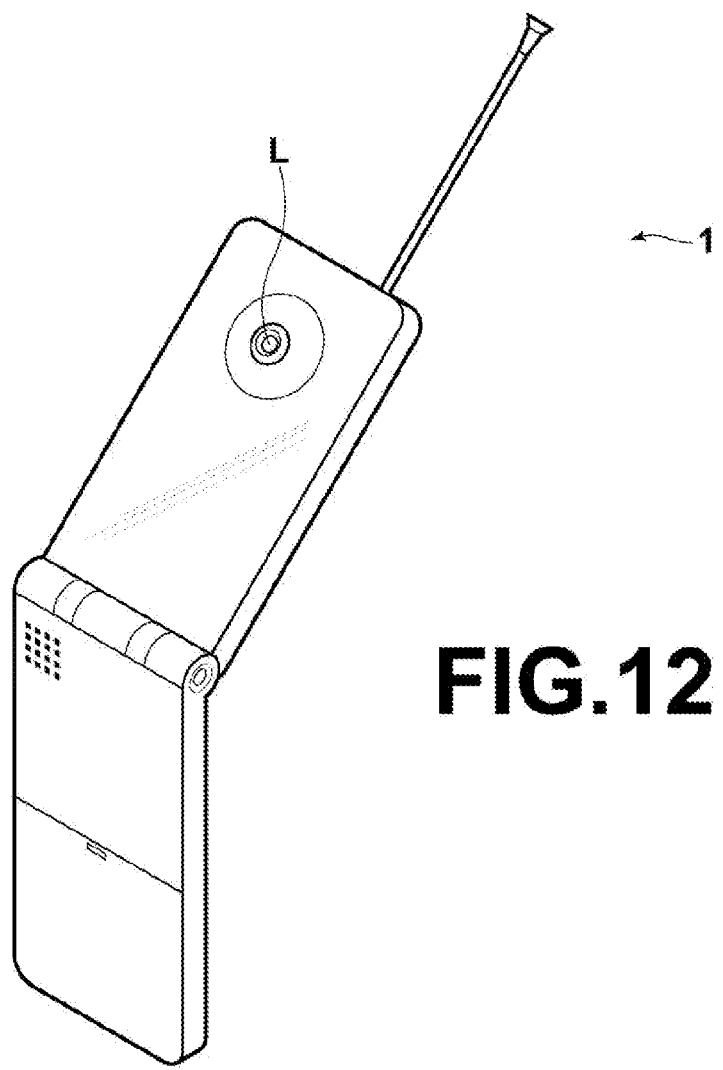

FIG. 12 is a diagram that illustrates a cellular telephone as an imaging apparatus equipped with the imaging lens of the present invention.

Figure 13:
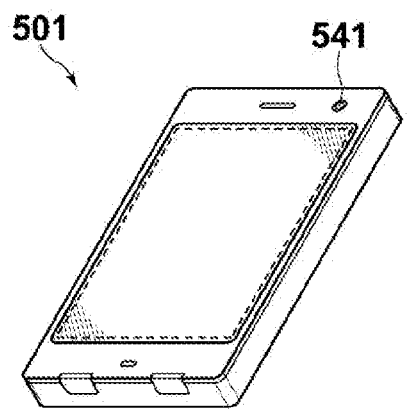

FIG. 13 is a diagram that illustrates a smart phone as an imaging apparatus equipped with the imaging lens of the present invention.

BEST MODE FOR CARRYING OUT THE INVENTION

Hereinafter, embodiments of the present invention will be described in detail with reference to the attached drawings.

Figure 1:
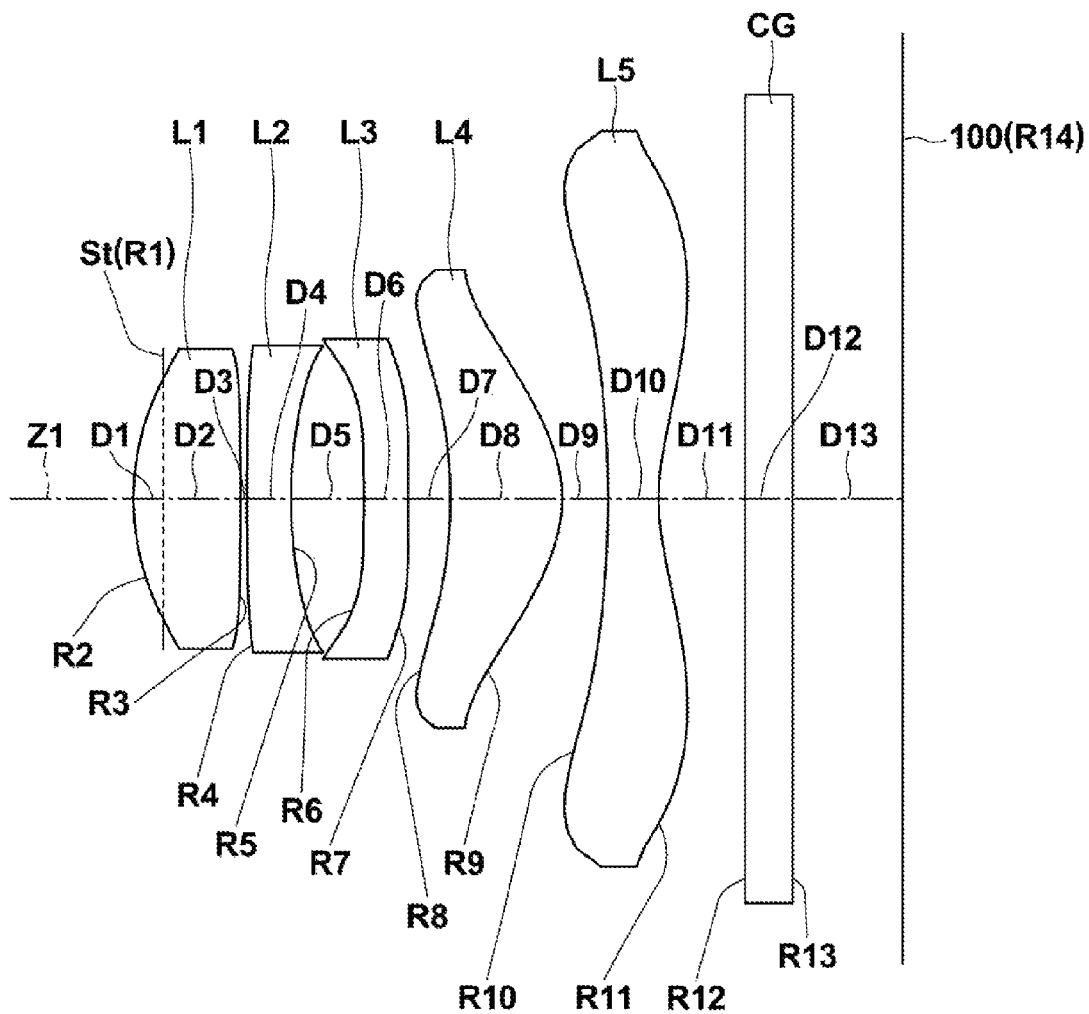
FIG. 1 is a sectional diagram that illustrates a first example of the configuration of an imaging lens according to an embodiment of the present invention, and corresponds to a lens of Example 1.
Figure 2:
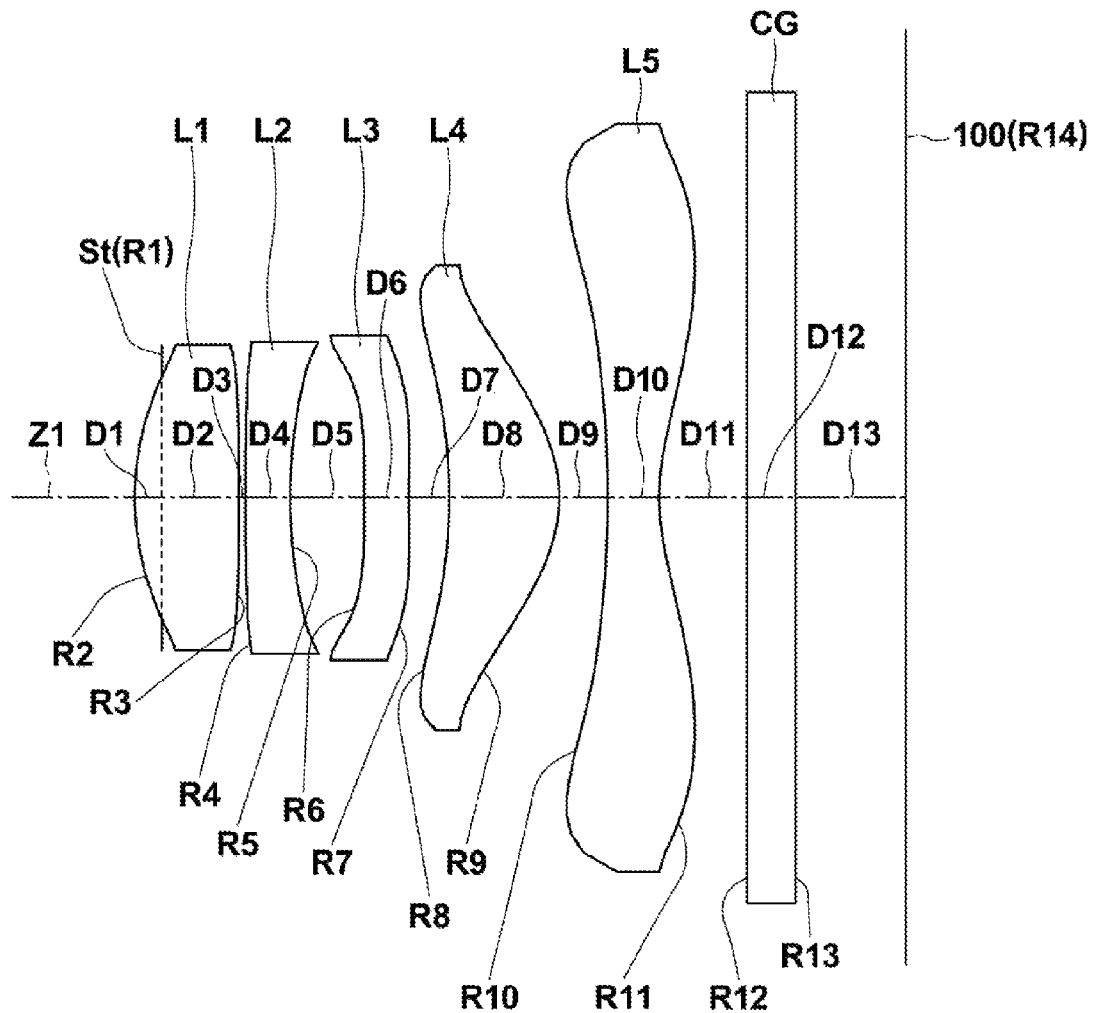
FIG. 2 is a sectional diagram that illustrates the configuration of an imaging lens that corresponds to a lens of Reference Example 2.
Figure 3:
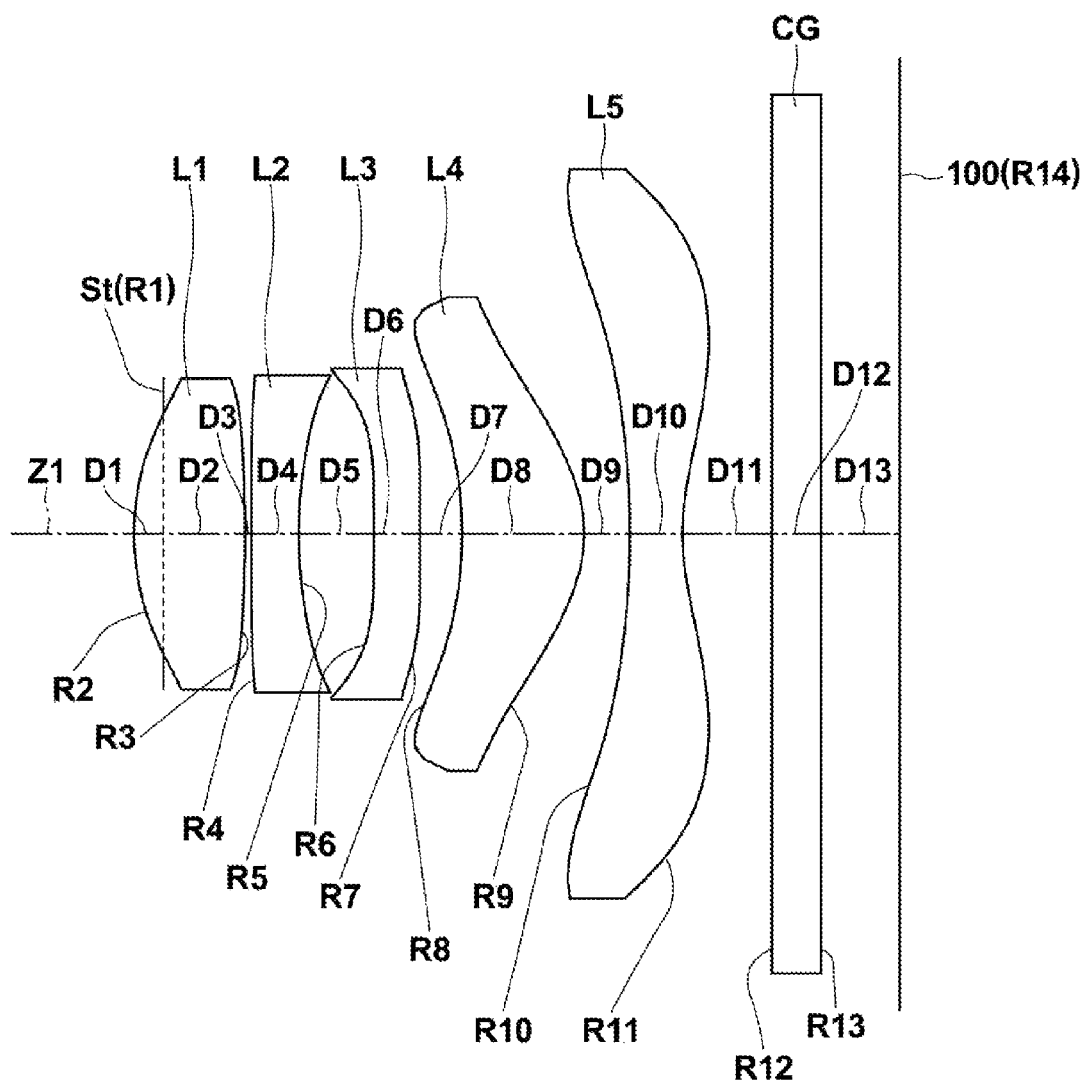
FIG. 3 is a sectional diagram that illustrates a third example of the configuration of an imaging lens according to an embodiment of the present invention, and corresponds to a lens of Example 3.
Figure 4:
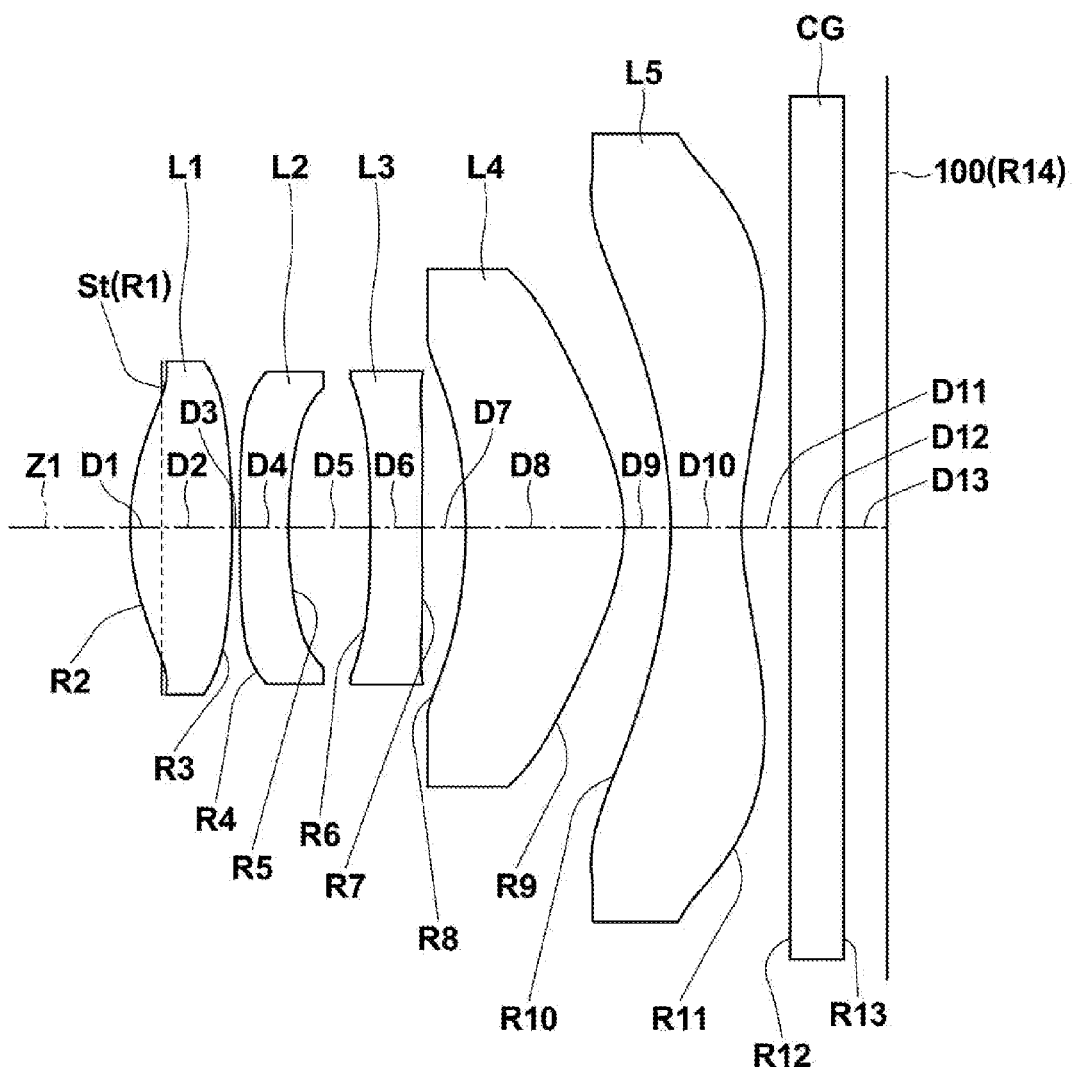
FIG. 4 is a sectional diagram that illustrates a fourth example of the configuration of an imaging lens according to an embodiment of the present invention, and corresponds to a lens of Example 4.
Figure 5:
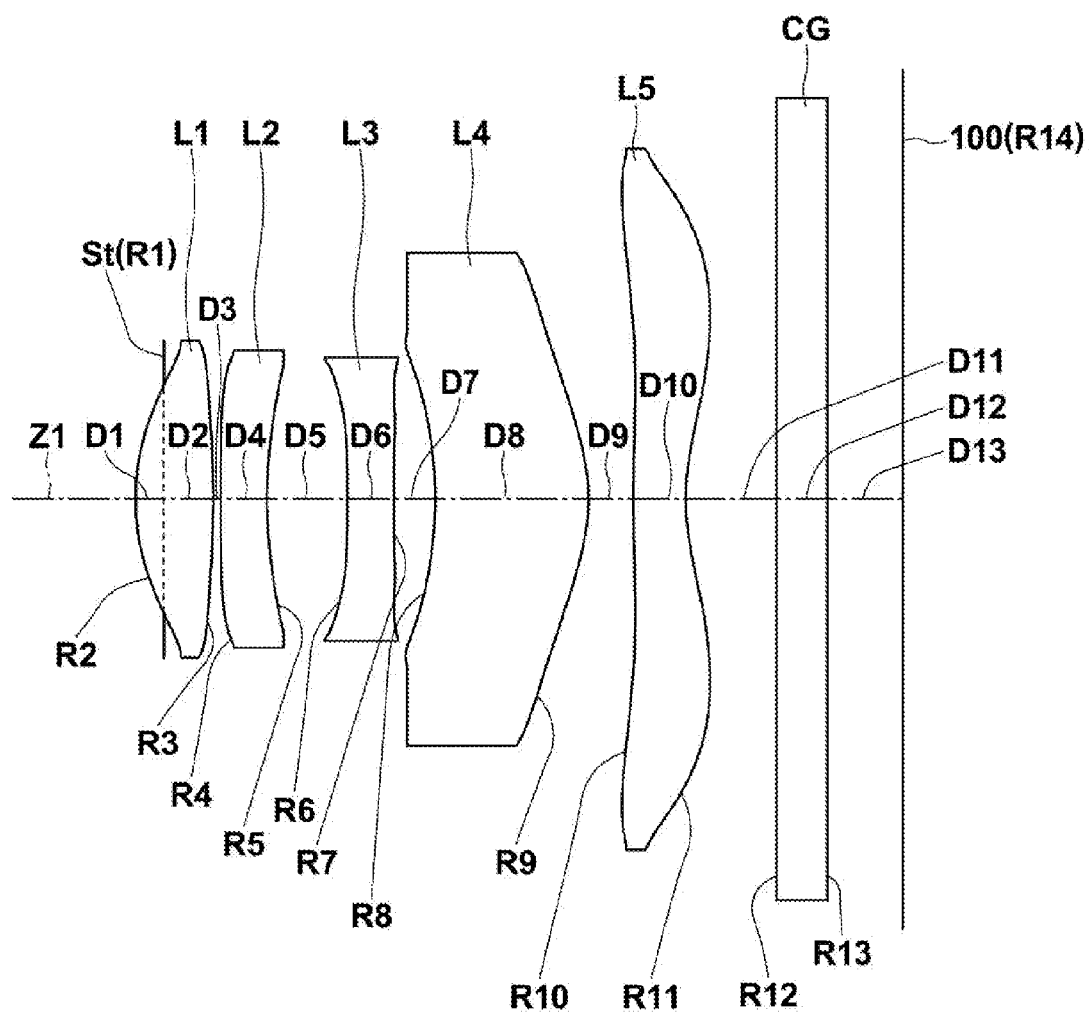
FIG. 5 is a sectional diagram that illustrates the configuration of an imaging lens that corresponds to a lens of Reference Example 5.
Figure 6:
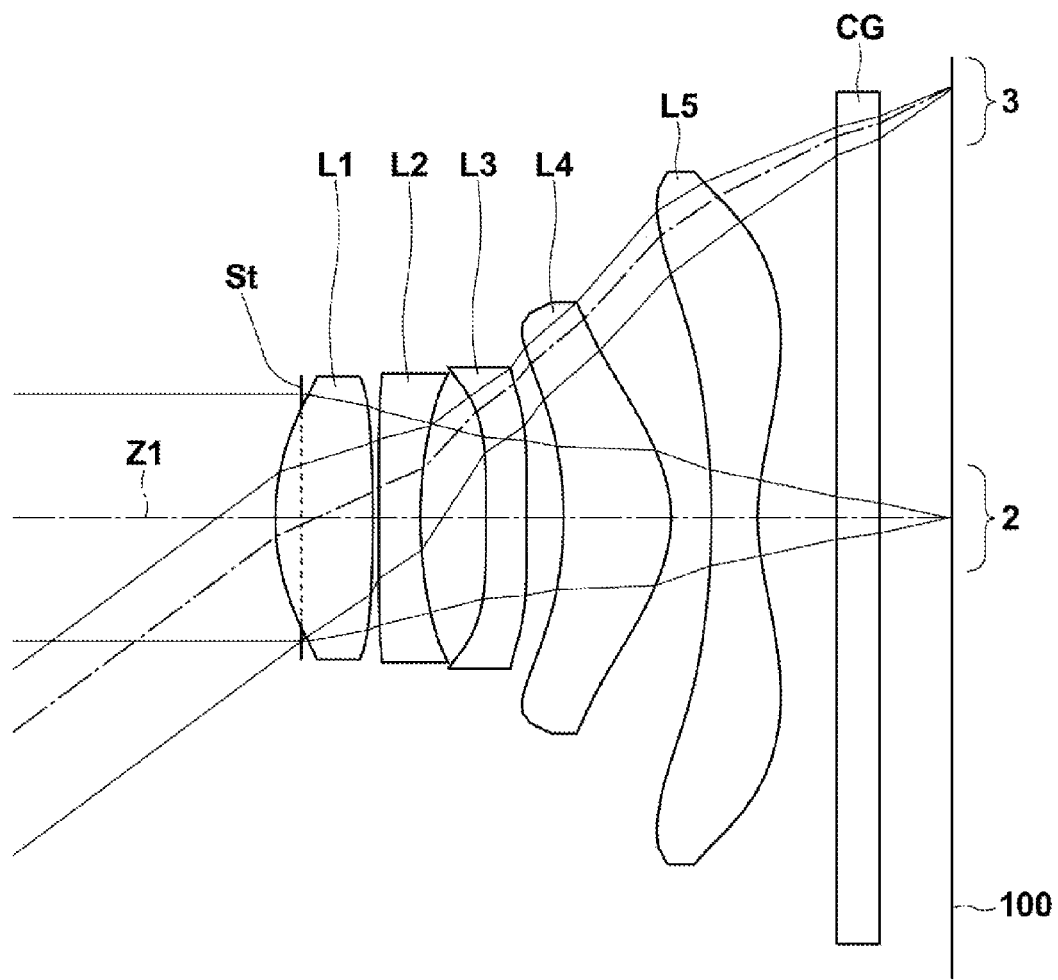
FIG. 6 is a diagram that illustrates the paths of light rays that pass through the imaging lens illustrated in FIG. 3.

FIG. 1 illustrates a first example of the configuration of an imaging lens according to an embodiment of the present invention. This example corresponds to the lens configuration of Numerical Example 1 (Table 1 and Table 2), to be described later. Similarly, FIG. 3 and FIG. 4 are sectional diagrams that illustrate second through fifth examples of lens configurations that correspond to Numerical Examples 3 and 4 (Table 5 through Table 8) while FIG. 2 and FIG. 5 are sectional diagrams of the lens configurations of second and fifth Reference Examples (Tables 3, 4, 9 and 10). In FIGS. 1 through 5, the symbol Ri represents the radii of curvature of ith surfaces, i being lens surface numbers that sequentially increase from the object side to the image side (imaging side), with the surface of a lens element most toward the object side designated as first. The symbol Di represents the distances between an ith surface and an i+1st surface along an optical axis Z1. Note that the basic configurations of the examples are the same, and therefore a description will be given of the imaging lens of FIG. 1 as a base, and the examples illustrated in FIGS. 2 through 5 will also be described as necessary. In addition, FIG. 6 is a diagram that illustrates the paths of light rays that pass through the imaging lens L of FIG. 3, and illustrates the paths of axial light beams 2 from an object at a distance of infinity and light beams 3 at a maximum angle of view.

The imaging lens L of the embodiment of the present invention is favorably employed in various imaging devices that employ imaging elements such as a CCD and a CMOS. The imaging lens L of the embodiment of the present invention is particularly favorable for use in comparatively miniature portable terminal devices, such as a digital still camera, a cellular telephone with a built in camera, a smart phone, a tablet type terminal, and a PDA. The imaging lens L is equipped with a first lens L1, a second lens L2, a third lens L3, a fourth lens L4, and a fifth lens L5, provided in this order from the object side along the optical axis Z1.

FIG. 12 schematically illustrates a cellular telephone as an imaging apparatus 1 according to an embodiment of the present invention. The imaging apparatus 1 of the embodiment of the present invention is equipped with the imaging lens L according to the embodiment of the present invention and an imaging element 100 (refer to FIG. 1) such as a CCD that outputs image signals corresponding to optical images formed by the imaging lens L. The imaging element 100 is provided at an image formation plane (imaging surface R14) of the imaging lens L.

FIG. 13 schematically illustrates a smart phone as an imaging apparatus 501 according to an embodiment of the present invention. The imaging apparatus 501 of the embodiment of the present invention is equipped with a camera section 541 having the imaging lens L according to the embodiment of the present invention and an imaging element 100 (refer to FIG. 1) such as a CCD that outputs image signals corresponding to optical images formed by the imaging lens L. The imaging element 100 is provided at an image formation plane (imaging surface) of the imaging lens L.

Various optical members CG may be provided between the fifth lens L5 and the imaging element 100, depending on the configuration of the camera to which the lens is applied. A planar optical member such as a cover glass for protecting the imaging surface and an infrared cutoff filter may be provided, for example. In this case, a planar cover glass having a coating having a filtering effect such as an infrared cutoff filter coating or an ND filter coating, or a material that exhibits similar effects, may be utilized as the optical member CG.

Alternatively, the optical member CG may be omitted, and a coating may be administered on the fifth lens L5 to obtain the same effect as that of the optical member CG. Thereby, the number of parts can be reduced, and the total length can be shortened.

It is preferable for the imaging lens L to be equipped with an aperture stop St positioned at the object side of the surface of the first lens L1 toward the object side. By positioning the aperture stop St at the object side of the surface of the first lens L1 toward the object side in this manner, increases in the incident angles of light rays that pass through the optical system and enter the image formation plane (imaging element) can be suppressed, particularly at peripheral portions of an imaging region. Note that the expression "positioned at the object side of the surface of the first lens toward the object side" means that the position of the aperture stop in the direction of the optical axis is at the same position as the intersection of marginal axial rays of light and the surface of the first lens L1 toward the object side, or more toward the object side than this position. In the embodiments, the lenses of Examples 1, 3 and 4 (FIGS. 1, 3 and 4) are examples of configurations in which the aperture stop St is positioned at the object side of the surface of the first lens L1 toward the object side.

In the embodiments of the present invention, the aperture stop St is positioned at the image side of the apex of the surface of the first lens L1. However, the present invention is not limited to this configuration, and the aperture stop St may be positioned at the object side of the apex of the surface of the first lens L1. A case in which the aperture stop St is positioned at the object side of the apex of the surface of the first lens L1 is somewhat disadvantageous from the viewpoint of securing peripheral light compared to a case in which the aperture stop St is positioned at the image side of the apex of the surface of the first lens L1. However, increases in the incident angles of light rays at peripheral portions of the imaging region that enter the image formation plane (imaging element) can be more favorably suppressed.

In the imaging lens L, the first lens L1 is of a biconvex shape in the vicinity of the optical axis. Thereby, the total length can be favorably shortened. The generation of spherical aberration in the case that the first lens L1 has a positive refractive power will be suppressed, by the first lens L1 being of a biconvex shape in the vicinity of the optical axis. Therefore, correction of spherical aberration will be facilitated.

The second lens L2 is of a meniscus shape in the vicinity of the optical axis, and has a concave surface toward the image side in the vicinity of the optical axis. Thereby, the total length can be favorably shortened. Further, by providing the second lens which is of a meniscus shape in the vicinity of the optical axis and has a concave surface toward the image side in the vicinity of the optical axis at the image side of the first lens L1, which is of a biconvex shape, correction of spherical aberration and chromatic aberration, which are generated at the first lens L1 of a biconvex shape, will be facilitated. At the same time, an image size that satisfies the requirements for a desired resolution can be maintained, and the total length can be shortened. Particularly in the case that the F number of the imaging lens as a whole is to be decreased, high order spherical aberration becomes likely to be generated in the imaging lens as a whole. However, the generation of high order spherical aberration can be favorably suppressed, by providing the second lens which is of a meniscus shape in the vicinity of the optical axis and has a concave surface toward the image side in the vicinity of the optical axis at the image side of the first lens L1, which is of a biconvex shape. In addition, it is preferable for the second lens L2 to have a negative refractive power in the vicinity of the optical axis. In this case, chromatic aberration can be favorably corrected.

The third lens L3 is of a biconcave shape in the vicinity of the optical axis. By providing the second lens having a concave surface toward the image side in the vicinity of the optical axis and the third lens L3 of a biconcave shape in the vicinity of the optical axis adjacent to each other at the image side of the first lens L1, which is of a biconvex shape in the vicinity of the optical axis, spherical aberration generated at the first lens L1, which is of a biconvex shape in the vicinity of the optical axis, can be favorably corrected. In addition, the third lens L3 has a negative refractive power. Therefore, correction of chromatic aberration is facilitated.

The fourth lens L4 is of a meniscus shape in the vicinity of the optical axis, and has a convex surface toward the image side in the vicinity of the optical axis. Thereby, astigmatism can be favorably corrected. In addition, it is preferable for the fourth lens L4 to have a positive refractive power in the vicinity of the optical axis. By adopting this configuration, increases in the incident angles of light rays that pass through the optical system and enter the image formation surface (imaging element) can be favorably suppressed at the peripheral portions of the imaging region.

The fifth lens L5 is of a biconcave shape in the vicinity of the optical axis. If the first lens L1 through the fourth lens L4 are considered to be a single positive lens group, the imaging lens will be of a telephoto type configuration as a whole, by the fifth lens L5 having a negative refractive power in the vicinity of the optical axis. For this reason, the rearward principal point of the imaging lens as a whole can be more toward the object side because the imaging lens L is of a telephoto configuration as a whole, and the total length can be favorably shortened. In addition, the fifth lens L5 is of a biconcave shape in the vicinity of the optical axis. Thereby, excessive increases in the absolute values of the radii of curvature of the surfaces of the fifth lens L5 can be suppressed, while the negative refractive power of the fifth lens L5 can be sufficiently increased. In addition, field curvature can be favorably corrected, by the fifth lens L5 being of a biconcave shape in the vicinity of the optical axis.

In addition, the surface toward the image side of the fifth lens L5 has at least one inflection point within the effective diameter thereof. The "inflection point" on the surface of the fifth lens L5 toward the image side refers to a point at which the shape of the surface of the fifth lens L5 toward the image side changes from a convex shape to a concave shape (or from a concave shape to a convex shape) with respect to the image side. The position of the inflection point may be any arbitrary position in an outwardly radial direction from the optical axis up to the effective diameter of the surface of the fifth lens L5 toward the image side. It is preferable for the inflection point to be positioned at the peripheral portion of the surface of the fifth lens L5 toward the image side. Increases in the incident angles of light rays that pass through the optical system at peripheral angles of view into the image formation plane (imaging element) can be suppressed, particularly at the peripheral portions of an imaging region, by the surface of the fifth lens L5 toward the image side being of a shape having at least one inflection point thereon. Note that here, the peripheral portion refers to a portion radially outward from approximately 40% of the effective diameter.

According to the imaging lens L described above, the configuration of each lens element, that is, the first through fifth lenses, is optimized within a lens configuration having five lenses as a whole. Therefore, a lens system having a short total length, a large image size, and high resolution performance can be realized.

In addition, in the case that the lens configurations of each of the first lens L1 through the fifth lens L5 are set such that the full angle of view 2ω is 60 degrees or greater as in the imaging lenses of the Examples illustrated in FIGS. 1, 3 and 4, the full angle of view 2ω will be an appropriate value. Therefore, the imaging lens L may be favorably applied for use with imaging apparatuses which are often employed to perform photography at close distances, such as cellular telephones.

It is preferable for at least one of the surfaces of each of the first lens L1 through the fifth lens L5 of the imaging lens L to be an aspherical surface, in order to improve performance.

In addition, it is preferable for each of the first lens L1 through the fifth lens L5 that constitute the imaging lens L to be a single lens, not a cemented lens. If all of the lenses are single lenses, the number of aspherical surfaces will be greater than a case in which some of the lenses are cemented lenses. Therefore, the degree of freedom in the design of each lens will increase. As a result, the total length can be favorably shortened.

Next, the operation and effects of conditional formulae related to the imaging lens L will be described in greater detail.

First, the focal length f1 of the first lens L1 and the focal length f of the entire system satisfy Conditional Formula (1) below.

$$1 < f/f1 < 3 \tag{1}$$

Conditional Formula (1) defines a preferable range of numerical values for the focal length f of the entire system with respect to the focal length f1 of the first lens L1. In the case that the value of f/f1 is less than the lower limit defined in Conditional Formula (1), the positive refractive power of the first lens L1 will become excessively weak with respect to the refractive power of the entire system, and it will be difficult to shorten the total length while favorably correcting various aberrations and maintaining a small F number. In the case that the value of f/f1 is greater than the upper limit defined in Conditional Formula (1), the positive refractive power of the first lens L1 will become excessively strong with respect to the refractive power of the entire system, and correction of spherical aberration will become difficult in particular. A small F number can be maintained while spherical aberration can be favorably corrected and the total length can be favorably shortened, by the range defined in Conditional Formula (1) being satisfied. It is more preferable for Conditional Formula (1-1) below to be satisfied, and even more preferable for Conditional Formula (1-2) below to be satisfied, in order to cause these advantageous effects to become more prominent.

$$1.1 < f/f1 < 2.5 \tag{1-1}$$

$$1.2 < f/f1 < 2.2 \tag{1-2}$$

In addition, it is preferable for the focal length f of the entire system and the focal length f3 of the third lens L3 to satisfy Conditional Formula (2) below:

$$-0.6 < f/f3 < 0 \tag{2}$$

Conditional Formula (2) defines a preferable range of numerical values for the focal length f of the entire system with respect to the focal length f3 of the third lens L3. In the case that the value of f/f3 is less than the lower limit defined in Conditional Formula (2), the refractive power of the third lens L3 will become excessively strong with respect to the refractive power of the entire system, and it will be difficult to shorten the total length while favorably correcting various aberrations and maintaining a small F number. In the case that the value of f/f3 is greater than the upper limit defined in Conditional Formula (2), the refractive power of the third lens L3 will become excessively weak with respect to the refractive power of the entire system, and correction of chromatic aberration will become difficult. For these reasons, a small F number can be maintained, the total length can be shortened, and various aberrations such as chromatic aberration can be favorably corrected, by the range defined in Conditional Formula (2) being satisfied. It is more preferable for Conditional Formula (2-1) to be satisfied, in order to cause these advantageous effects to become more prominent.

$$-0.5 < f/f3 < -0.1 \tag{2-1}$$

In addition, it is preferable for the focal length f of the entire system and the focal length f5 of the fifth lens L5 to satisfy Conditional Formula (3) below:

$$-3 < f/f5 < -1.2 \tag{3}$$

Conditional Formula (3) defines a preferable range of numerical values for the focal length f of the entire system with respect to the focal length f5 of the fifth lens L5. The refractive power of the fifth lens L5 will not become excessively strong with respect to the refractive power of the entire system, by the lower limit of Conditional Formula (3) being satisfied. As a result, increases in the incident angles of light rays that pass through the optical system and enter the image formation plane (imaging element) can be favorably suppressed at the peripheral portions of the imaging region. In the case that the value of f/f5 is greater than the upper limit defined in Conditional Formula (3), the refractive power of the fifth lens L5 will become excessively weak with respect to the refractive power of the entire system, and correction of field curvature will become difficult. For these reasons, increases in the incident angles of light rays that pass through the optical system and enter the image formation plane (imaging element) can be favorably suppressed at the peripheral portions of the imaging region, and field curvature can be favorably corrected, by the range defined in Conditional Formula (3) being satisfied. It is more preferable for Conditional Formula (3-1) to be satisfied, in order to cause these advantageous effects to become more prominent.

$$-2.5 < f/f5 < -1.3 \tag{3-1}$$

In addition, it is preferable for the focal length f of the entire system and the focal length f2 of the second lens L2 to satisfy Conditional Formula (4) below:

$$-2 < f/f2 < -0.4 \tag{4}$$

Conditional Formula (4) defines a preferable range of numerical values for the focal length f of the entire system with respect to the focal length f2 of the second lens L2. In the case that the value of f/f2 is less than the lower limit defined in Conditional Formula (4), the refractive power of the second lens L2 will become excessively strong with respect to the positive refractive power of the entire system, and it will become difficult to shorten the total length while maintaining a small F number and sufficiently correcting various aberrations. In the case that the value of f/f2 is greater than the upper limit defined in Conditional Formula (4), the refractive power of the second lens L2 will become excessively weak with respect to the refractive power of the entire system, and correction of chromatic aberration will become difficult. For these reasons, a small F number can be maintained and the total length can be shortened, while various aberrations such as chromatic aberration can be favorably corrected, by the range defined in Conditional Formula (4) being satisfied. It is more preferable for Conditional Formula (4-1) to be satisfied, in order to cause these advantageous effects to become more prominent.

$$-1.5 < f/f2 < -0.5 \tag{4-1}$$

In addition, it is preferable for the focal length f of the entire system and the focal length f4 of the fourth lens L4 to satisfy Conditional Formula (5) below:

$$1 < f/f4 < 2.5 \tag{5}$$

Conditional Formula (5) defines a preferable range of numerical values for the focal length f of the entire system with respect to the focal length f4 of the fourth lens L4. The refractive power of the fourth lens L4 will not become excessively weak with respect to the refractive power of the entire system, by the lower limit of Conditional Formula (5) being satisfied. As a result, increases in the incident angles of light rays that pass through the optical system and enter the image formation plane (imaging element) can be favorably suppressed at the peripheral portions of the imaging region. In the case that the value of f/f4 is greater than the upper limit defined in Conditional Formula (5), the refractive power of the fourth lens L4 will become excessively strong with respect to the refractive power of the entire system, and correction of field curvature will become difficult. For these reasons, increases in the incident angles of light rays that pass through the optical system and enter the image formation plane (imaging element) can be favorably suppressed at the peripheral portions of the imaging region, and field curvature can be favorably corrected, by the range defined in Conditional Formula (5) being satisfied. It is more preferable for Conditional Formula (5-1) to be satisfied, in order to cause these advantageous effects to become more prominent.

$$1.1 < f/f4 < 2.3 \tag{5-1}$$

In addition, it is preferable for the Abbe's number vd3 of the third lens L3 with respect to the d line to satisfy Conditional Formula (6) below:

$$vd3 < 30 \tag{6}$$

Conditional Formula (6) defines a preferable range of numerical values for the Abbe's number vd3 of the third lens L3 with respect to the d line. In the case that the value of vd3 is greater than the upper limit defined in Conditional Formula (6), correction of longitudinal chromatic aberration and lateral chromatic aberration will become difficult. The third lens L3 can be formed by a high dispersion material by satisfying Conditional Formula (6). As a result, longitudinal chromatic aberration and lateral chromatic aberration can be favorably corrected. From this viewpoint, it is more preferable for Conditional Formula (6-1) below to be satisfied.

$$vd3 < 26 \tag{6-1}$$

As described above, in the imaging lenses L of the Examples of the present invention, the configuration of each lens element is optimized within a lens configuration having fifth lenses as a whole. Therefore, a lens system that has a small F number, a short total length, a large image size, and high resolution performance can be realized.

Note that in contrast, Chinese Utility Model Publication No. 201903684 discloses an imaging lens having a large F number, or an imaging lens having a comparatively small F number but is not capable of sufficiently correcting spherical aberration. The imaging lens disclosed in International Patent Publication No. 2011/118554 has a large F number, and does not sufficiently correct spherical aberration. The lens disclosed in Japanese Unexamined Patent Publication No. 2010-152042 does not sufficiently correct longitudinal chromatic aberration or spherical aberration, and therefore it cannot be said that this imaging lens has sufficiently high resolution performance.

Further improved imaging performance can be realized by appropriately satisfying preferred conditions. In addition, the imaging apparatuses according to the embodiments of the present invention output image signals corresponding to optical images formed by the high performance imaging lenses according to the embodiments of the present invention. Therefore, photographed images having high resolution from a central angle of view to peripheral angles of view can be obtained.

Next, specific examples of numerical values of the imaging lens of the present invention will be described. A plurality of examples of numerical values will be summarized and explained below.

Table 1 and Table 2 below show specific lens data corresponding to the configuration of the imaging lens illustrated in FIG. 1. Specifically, Table 1 shows basic lens data of the imaging lens, and Table 2 shows data related to aspherical surfaces. In the lens data of Table 1, ith numbers of the surfaces of lens elements that sequentially increase from the object side to the image side, with the lens element at the most object side designated as first (the aperture stop St is first), are shown in the column Si for the imaging lens of Example 1. The radii of curvature (mm) of ith surfaces from the object side corresponding to the symbols Ri illustrated in FIG. 1 are shown in the column Ri. Similarly, the distances (mm) between an ith surface Si and an i+1st surface Si+1 from the object side along the optical axis are shown in the column Di. The refractive indices of jth optical elements from the object side with respect to the d line (wavelength: 587.56 nm) are shown in the column Ndj. The Abbe's numbers of the jth optical elements with respect to the d line are shown in the column vdj. In addition, Table 1 also shows the focal length f (mm) of the entire system and the back focus Bf (mm) as various data. Note that the back focus Bf is represented as an air converted value.

In the imaging lens of Example 1, both of the surfaces of all of the first lens L1 through the fifth lens L5 are aspherical in shape. In the basic lens data of Table 1, numerical values of radii of curvature in the vicinity of the optical axis (paraxial radii of curvature) are shown as the radii of curvature of the aspherical surfaces.

Table 2 shows aspherical surface data of the imaging lens of Example 1. In the numerical values shown as the aspherical surface data, the symbol "E" indicates that the numerical value following thereafter is a "power index" having 10 as a base, and that the numerical value represented by the index function having 10 as a base is to be multiplied by the numerical value in front of "E". For example, "1.0E-02" indicates that the numerical value is "$1.0 \cdot 10^{-2}$".

The values of coefficients Ai and KA represented by the aspherical surface shape formula (A) below are shown as the aspherical surface data. In greater detail, Z is the length (mm) of a normal line that extends from a point on the aspherical surface having a height h to a plane (a plane perpendicular to the optical axis) that contacts the apex of the aspherical surface.

$$Z = C \cdot h^2 / \{1 + (1 - KA \cdot C^2 \cdot h^2)^{1/2}\} + \Sigma Ai \cdot h^i \quad (A)$$

wherein: Z is the depth of the aspherical surface (mm), h is the distance from the optical axis to the surface of the lens (height) (mm), C is the paraxial curvature=1/R (R is the paraxial radius of curvature), Ai is an ith ordinal aspherical surface coefficient (i is an integer 3 or greater), and KA is an aspherical surface coefficient.

Detailed lens data corresponding to the configuration of the imaging lens illustrated in FIG. 2 are shown in Table 3 and Table 4 as Reference Example 2, in the same manner as that for Example 1. Similarly, detailed lens data corresponding to the configurations of the imaging lenses illustrated in FIG. 3 through FIG. 5 are shown in Table 5 through Table 10 as Examples 3 and 4 and Reference Example 5. In the imaging lenses of Examples 1, 3 and 4, both of the surfaces of all of the first lens L1 through the fifth lens L5 are aspherical surfaces.

A through D of FIG. 7 are diagrams that illustrate aberrations of the imaging lens of Example 1, wherein the diagrams respectively illustrate spherical aberration, astigmatism, distortion and lateral chromatic aberration (chromatic aberration of magnification) of the imaging lens of Example 1. Each of the diagrams that illustrate spherical aberration, astigmatism (field curvature) and distortion illustrate aberrations using the d line (wavelength: 587.56 nm) as a reference wavelength. The diagrams that illustrate spherical aberration and lateral chromatic aberration also show aberrations related to the F line (wavelength: 486.1 nm) and the C line (wavelength: 656.27 nm). In addition, the diagram that illustrates spherical aberration also shows aberration related to the g line (wavelength: 435.83 nm). In the diagram that illustrates astigmatism, aberration in the sagittal direction (S) is indicated by a solid line, while aberration in the tangential direction (T) is indicated by a broken line. In addition, "Fno." denotes an F number, and "ω" denotes a half angle of view.

Similarly, various aberrations of the imaging lens of Reference Example 2, Example 3, Example 4 and Reference Example 5 are illustrated in A through D of FIG. 8 through A through D of FIG. 11.

Table 11 shows values corresponding to Conditional Formulae (1) through (6), respectively summarized for each of Example 1, Reference Example 2, Example 3, Example 4 and Reference Example 5.

As can be understood from each set of numerical value data and from the diagrams that illustrate aberrations, each of the Examples realize a shortening of the total length and high imaging performance.

Note that the imaging lens of the present invention is not limited to the embodiments and Examples described above, and various modifications are possible. For example, the values of the radii of curvature, the distances among surfaces, the refractive indices, the Abbe's numbers, the aspherical surface coefficients, etc., are not limited to the numerical values indicated in connection with the Examples of numerical values, and may be other values.

In addition, the Examples are described under the presumption that they are to be utilized with fixed focus. However, it is also possible for configurations capable of adjusting focus to be adopted. It is possible to adopt a configuration, in which the entirety of the lens system is fed out or a portion of the lenses is moved along the optical axis to enable automatic focus, for example. In addition, each of the lenses which are of meniscus shapes in the vicinity of the optical axis in the imaging lens of the present invention may be configured such that the surface of the meniscus shape having a radius of curvature with the greater absolute value in the vicinity of the optical axis is a planar surface in the vicinity of the optical axis. In other words, the lenses which are of meniscus shapes in the vicinity of the optical axis may be planoconvex lenses or planoconcave lenses, in which the surface of the meniscus shape having a radius of curvature with the greater absolute value is a planar surface in the vicinity of the optical axis.

TABLE 1

Example 1
f = 4.04, Bf = 1.44

| Si | Ri | Di | Ndj | νdj |
|---|---|---|---|---|
| 1 (aperture stop) | ∞ | −0.19 | | |
| * 2 | 1.5725 | 0.68 | 1.54488 | 54.87 |
| * 3 | −38.4983 | 0.04 | | |
| * 4 | 31.5183 | 0.28 | 1.63351 | 23.63 |
| * 5 | 3.0023 | 0.46 | | |
| * 6 | −37.8840 | 0.28 | 1.63351 | 23.63 |
| * 7 | 13.9428 | 0.27 | | |
| * 8 | −3.0064 | 0.71 | 1.54488 | 54.87 |
| * 9 | −0.8538 | 0.29 | | |
| * 10 | −7.3596 | 0.32 | 1.54488 | 54.87 |
| * 11 | 1.3520 | 0.55 | | |
| 12 | ∞ | 0.30 | 1.56700 | 37.80 |
| 13 | ∞ | 0.70 | | |
| 14 (imaging surface) | ∞ | | | |

* aspherical surface

TABLE 3

Reference Example 2
f = 3.79, Bf = 1.43

| Si | Ri | Di | Ndj | νdj |
|---|---|---|---|---|
| 1 (aperture stop) | ∞ | −0.17 | | |
| * 2 | 1.7111 | 0.65 | 1.54488 | 54.87 |
| * 3 | −38.4983 | 0.04 | | |
| * 4 | 27.8449 | 0.28 | 1.63351 | 23.63 |
| * 5 | 3.2507 | 0.46 | | |
| * 6 | −50.5759 | 0.28 | 1.63351 | 23.63 |
| * 7 | 17.3180 | 0.25 | | |
| * 8 | −3.5641 | 0.69 | 1.54488 | 54.87 |
| * 9 | −0.8444 | 0.30 | | |
| * 10 | −8.2232 | 0.32 | 1.54488 | 54.87 |
| * 11 | 1.2919 | 0.55 | | |
| 12 | ∞ | 0.30 | 1.56700 | 37.80 |
| 13 | ∞ | 0.69 | | |
| 14 (imaging surface) | ∞ | | | |

* aspherical surface

TABLE 2

Example 1: Aspherical Surface Data

| Surface Number | KA | A3 | A4 | A5 | A6 |
|---|---|---|---|---|---|
| 2 | −1.8276342E−01 | −7.1785007E−02 | 7.2154734E−01 | −5.1683735E+00 | 3.6001004E+01 |
| 3 | −2.8808170E+01 | −1.3170910E−01 | 6.6088399E−01 | −1.1876524E+00 | −1.2586923E+00 |
| 4 | −2.4791656E+03 | −4.6023959E−02 | 8.9825080E−02 | −2.2689095E−01 | 9.2363462E+00 |
| 5 | 2.3549936E−01 | 3.9013840E−02 | −4.7604653E−01 | 2.1537240E+00 | −4.4463872E+00 |
| 6 | −1.0838920E+07 | −8.7639885E−02 | 6.3038907E−01 | −3.7322338E+00 | 7.1232576E+00 |
| 7 | 2.5017836E+01 | 9.5048178E−03 | −5.4429845E−01 | 3.7512655E+00 | −2.4624904E+01 |
| 8 | 4.9945775E−01 | −5.9526846E−02 | 1.3907830E−01 | 5.8618111E−01 | −6.6579669E+00 |
| 9 | −2.1064365E−01 | 2.4430640E−02 | 2.9723888E−01 | −7.5024711E−01 | 4.1975166E+00 |
| 10 | −1.9877008E+00 | −1.0031709E−01 | 4.2203222E−01 | −1.1992079E+00 | 3.1804159E+00 |
| 11 | 1.6949697E−03 | 1.5443593E−02 | −8.9822742E−01 | 1.5871227E+00 | −2.0806548E+00 |

| | A7 | A8 | A9 | A10 | A11 |
|---|---|---|---|---|---|
| 2 | −2.0909534E+02 | 8.9907497E+02 | −2.7872861E+03 | 6.2918272E+03 | −1.0438289E+04 |
| 3 | 8.5603325E+00 | −9.9319587E+00 | −4.5897635E+00 | 1.2510165E+01 | −1.8244083E+00 |
| 4 | −8.3476942E+01 | 4.0360414E+02 | −1.2737368E+03 | 2.8491246E+03 | −4.6716505E+03 |
| 5 | 1.9330078E+00 | 9.0736588E+00 | −1.5174626E+01 | 4.9518676E+00 | 1.0003630E−02 |
| 6 | −2.8909663E+00 | −1.2924256E+01 | 2.1357473E+01 | −5.1807283E+00 | −8.5785407E+00 |
| 7 | 1.1074967E+02 | −3.5932533E+02 | 8.5583762E+02 | −1.5031473E+03 | 1.9394051E+03 |
| 8 | 2.9526658E+01 | −8.5052438E+01 | 1.7657887E+02 | −2.7055063E+02 | 3.0574466E+02 |
| 9 | −1.7080485E+01 | 4.4001704E+01 | −7.8899513E+01 | 1.0357520E+02 | −1.0055222E+02 |
| 10 | −7.3316794E+00 | 1.3109817E+01 | −1.7401075E+01 | 1.6838279E+01 | −1.1741603E+01 |
| 11 | 3.0349835E+00 | −4.5479088E+00 | 5.4653215E+00 | −4.7977563E+00 | 3.0217630E+00 |

| | A12 | A13 | A14 | A15 | A16 |
|---|---|---|---|---|---|
| 2 | 1.2664582E+04 | −1.0950310E+04 | 6.3801221E+03 | −2.2376338E+03 | 3.5552697E+02 |
| 3 | 1.2020475E+01 | −4.7118879E+01 | 5.2030679E+01 | −2.3110644E+01 | 3.3061500E+00 |
| 4 | 5.6165810E+03 | −4.8167963E+03 | 2.7792164E+03 | −9.6211523E+02 | 1.5022720E+02 |
| 5 | 1.3114009E+01 | −1.4341100E+01 | −4.3909212E+00 | 1.2292135E+01 | −4.6806767E+00 |
| 6 | −8.0503718E+00 | 2.6214282E+01 | −1.8467129E+01 | 4.2869534E+00 | 4.9840047E−02 |
| 7 | −1.8119023E+03 | 1.1900927E+03 | −5.2008409E+02 | 1.3554598E+02 | −1.5923479E+01 |
| 8 | −2.5201460E+02 | 1.4805272E+02 | −5.9085521E+01 | 1.4410762E+01 | −1.6200663E+00 |
| 9 | 7.1163465E+01 | −3.5515149E+01 | 1.1787697E+01 | −2.3271778E+00 | 2.0643102E−01 |
| 10 | 5.8126361E+00 | −1.9877487E+00 | 4.4566425E−01 | −5.8878540E−02 | 3.4730969E−03 |
| 11 | −1.3530285E+00 | 4.2135358E−01 | −8.6912723E−02 | 1.0682785E−02 | −5.9131322E−04 |

TABLE 4

Reference Example 2: Aspherical Surface Data

| Surface Number | KA | A3 | A4 | A5 | A6 |
|---|---|---|---|---|---|
| 2 | −1.8806800E−01 | −7.3103389E−02 | 7.1669191E−01 | −5.1734138E+00 | 3.5997253E+01 |
| 3 | 1.8839814E+01 | −1.3575040E−01 | 6.5876206E−01 | −1.1884781E+00 | −1.2584647E+00 |
| 4 | −2.9391229E+03 | −4.4885957E−02 | 8.9944179E−02 | −2.2780119E−01 | 9.2348637E+00 |
| 5 | 2.1458688E−01 | 3.6296691E−02 | −4.7865886E−01 | 2.1508705E+00 | −4.4493128E+00 |
| 6 | −3.6905979E+07 | −8.8881418E−02 | 6.3214308E−01 | −3.7300664E+00 | 7.1255506E+00 |
| 7 | 2.4039523E+01 | 1.0527561E−02 | −5.4485188E−01 | 3.7506998E+00 | −2.4625106E+01 |
| 8 | 4.9532454E−01 | −5.9454329E−02 | 1.3950824E−01 | 5.8633134E−01 | −6.6580655E+00 |
| 9 | −2.0111296E−01 | 2.4617519E−02 | 2.9638600E−01 | −7.5077350E−01 | 4.1973058E+00 |
| 10 | −1.9934024E+00 | −1.0081532E−01 | 4.2197981E−01 | −1.1992691E+00 | 3.1803852E+00 |
| 11 | 6.1903671E−03 | 1.6913983E−02 | −8.9804171E−01 | 1.5872196E+00 | −2.0805948E+00 |

| | A7 | A8 | A9 | A10 | A11 |
|---|---|---|---|---|---|
| 2 | −2.0909788E+02 | 8.9907338E+02 | −2.7872866E+03 | 6.2918274E+03 | −1.0438286E+04 |
| 3 | 8.5607784E+00 | −9.9315492E+00 | −4.5879059E+00 | 1.2509580E+01 | −1.8252878E+00 |
| 4 | −8.3478667E+01 | 4.0360259E+02 | −1.2737372E+03 | 2.8491238E+03 | −4.6716505E+03 |
| 5 | 1.9301237E+00 | 9.0706403E+00 | −1.5177952E+01 | 4.9488901E+01 | 7.2660749E−03 |
| 6 | −2.8884324E+00 | −1.2921242E+01 | 2.1360755E+01 | −5.1770436E+00 | −8.5745828E+00 |
| 7 | 1.1074963E+02 | −3.5932525E+02 | 8.5583778E+02 | −1.5031472E+03 | 1.9394051E+03 |
| 8 | 2.9526491E+01 | −8.5052585E+01 | 1.7657874E+02 | −2.7055068E+02 | 3.0574460E+02 |
| 9 | −1.7080488E+01 | 4.4001783E+01 | −7.8899424E+01 | 1.0357528E+02 | −1.0055218E+02 |
| 10 | −7.3316999E+00 | 1.3109810E+01 | −1.7401077E+01 | 1.6838279E+01 | −1.1741603E+01 |
| 11 | 3.0350106E+00 | −4.5478982E+00 | 5.4653253E+00 | −4.7977551E+00 | 3.0217632E+00 |

| | A12 | A13 | A14 | A15 | A16 |
|---|---|---|---|---|---|
| 2 | 1.2664584E+04 | −1.0950308E+04 | 6.3801222E+03 | −2.2376351E+03 | 3.5552547E+02 |
| 3 | 1.2018879E+01 | −4.7117866E+01 | 5.2029299E+01 | −2.3106772E+01 | 3.3107258E+00 |
| 4 | 5.6165812E+03 | −4.8167927E+03 | 2.7792166E+03 | −9.6211312E+02 | 1.5022597E+02 |
| 5 | 1.3114645E+01 | −1.4342419E+01 | −4.3907441E+00 | 1.2295988E+01 | −4.6749594E+00 |
| 6 | −8.0452423E+00 | 2.6218286E+01 | −1.8463386E+01 | 4.2902841E+00 | 5.1834895E−02 |
| 7 | −1.8119023E+03 | 1.1900926E+03 | −5.2008418E+02 | 1.3554577E+02 | −1.5923693E+01 |
| 8 | −2.5201463E+02 | 1.4805268E+02 | −5.9085549E+01 | 1.4410739E+01 | −1.6200996E+00 |
| 9 | 7.1163493E+01 | −3.5515133E+01 | 1.1787702E+01 | −2.3271747E+00 | 2.0643507E−01 |
| 10 | 5.8126363E+00 | −1.9877485E+00 | 4.4566439E−01 | −5.8878456E−02 | 3.4731448E−03 |
| 11 | −1.3530285E+00 | 4.2135351E−01 | −8.6912770E−02 | 1.0682752E−02 | −5.9133165E−04 |

TABLE 5

Example 3
f = 3.95, Bf = 1.22

| Si | Ri | Di | Ndj | vdj |
|---|---|---|---|---|
| 1 (aperture stop) | ∞ | −0.18 | | |
| * 2 | 1.5300 | 0.68 | 1.54488 | 54.87 |
| * 3 | −9.6251 | 0.04 | | |
| * 4 | 63.8202 | 0.29 | 1.63351 | 23.63 |
| * 5 | 2.8161 | 0.46 | | |
| * 6 | −27.8346 | 0.28 | 1.61399 | 25.48 |
| * 7 | 16.2178 | 0.26 | | |
| * 8 | −2.6841 | 0.75 | 1.54488 | 54.87 |

TABLE 5-continued

Example 3
f = 3.95, Bf = 1.22

| Si | Ri | Di | Ndj | vdj |
|---|---|---|---|---|
| * 9 | −0.8580 | 0.28 | | |
| * 10 | −5.8276 | 0.32 | 1.54488 | 54.87 |
| * 11 | 1.3572 | 0.55 | | |
| 12 | ∞ | 0.30 | 1.56700 | 37.80 |
| 13 | ∞ | 0.48 | | |
| 14 (imaging surface) | ∞ | | | |

* aspherical surface

TABLE 6

Example 3: Aspherical Surface Data

| Surface Number | KA | A3 | A4 | A5 | A6 |
|---|---|---|---|---|---|
| 2 | −1.6624656E−01 | −7.1315057E−02 | 7.2180653E−01 | −5.1689612E+00 | 3.5999388E+01 |
| 3 | −2.8327038E+01 | −1.2616191E−01 | 6.6073379E−01 | −1.1882773E+00 | −1.2595690E+00 |
| 4 | −7.4872574E+05 | −4.7548465E−02 | 9.0108561E−02 | −2.2701518E−01 | 9.2341977E+00 |
| 5 | 8.9303253E−02 | 3.1636657E−02 | −4.8171518E−01 | 2.1530659E+00 | −4.4431058E+00 |
| 6 | −3.6752801E+06 | −7.5665060E−02 | 6.3115620E−01 | −3.7313615E+00 | 7.1250252E+00 |
| 7 | 2.5693674E+01 | 1.7749622E−02 | −5.3940038E−01 | 3.7528508E+00 | −2.4624976E+01 |
| 8 | 5.3485678E−01 | −7.2996098E−02 | 1.3129874E−01 | 5.8443983E−01 | −6.6583497E+00 |
| 9 | −2.0266329E−01 | 1.6519487E−02 | 2.9892219E−01 | −7.4841523E−01 | 4.1981097E+00 |
| 10 | −2.1250433E+00 | −1.0113250E−01 | 4.2115810E−01 | −1.1994295E+00 | 3.1803789E+00 |
| 11 | −1.7713791E−03 | 1.1408982E−02 | −9.0007559E−01 | 1.5861335E+00 | −2.0811826E+00 |

TABLE 6-continued

Example 3: Aspherical Surface Data

| | A7 | A8 | A9 | A10 | A11 |
|---|---|---|---|---|---|
| 2 | −2.0909649E+02 | 8.9907373E+02 | −2.7872872E+03 | 6.2918264E+03 | −1.0438292E+04 |
| 3 | 8.5588182E+00 | −9.9340548E+00 | −4.5906707E+00 | 1.2505828E+01 | −1.8307921E+00 |
| 4 | −8.3479651E+01 | 4.0360225E+02 | −1.2737282E+03 | 2.8491233E+03 | −4.6716518E+03 |
| 5 | 1.9372773E+00 | 9.0774649E+00 | −1.5171445E+01 | 4.9520569E+00 | 7.3422486E−03 |
| 6 | −2.8889621E+00 | −1.2922572E+01 | 2.1356885E+01 | −5.1826223E+00 | −8.5798083E+00 |
| 7 | 1.1074925E+02 | −3.5932561E+02 | 8.5583687E+02 | −1.5031471E+03 | 1.9394055E+03 |
| 8 | 2.9526958E+01 | −8.5052759E+01 | 1.7657881E+02 | −2.7055081E+02 | 3.0574437E+02 |
| 9 | −1.7080227E+01 | 4.4001795E+01 | −7.8899504E+01 | 1.0357519E+02 | −1.0055225E+02 |
| 10 | −7.3316717E+00 | 1.3109818E+01 | −1.7401078E+01 | 1.6838281E+01 | −1.1741602E+01 |
| 11 | 3.0348268E+00 | −4.5479411E+00 | 5.4653183E+00 | −4.7977526E+00 | 3.0217649E+00 |

| | A12 | A13 | A14 | A15 | A16 |
|---|---|---|---|---|---|
| 2 | 1.2664581E+04 | −1.0950312E+04 | 6.3801242E+03 | −2.2376366E+03 | 3.5552520E+02 |
| 3 | 1.2014556E+01 | −4.7120443E+01 | 5.2026106E+01 | −2.3107503E+01 | 3.3180389E+00 |
| 4 | 5.6165801E+03 | −4.8168075E+03 | 2.7792125E+03 | −9.6210270E+02 | 1.5022598E+02 |
| 5 | 1.3099443E+01 | −1.4351927E+01 | −4.3981805E+00 | 1.2300208E+01 | −4.6803596E+00 |
| 6 | −8.0545716E+00 | 2.6213435E+01 | −1.8468827E+01 | 4.2806974E+00 | 4.1327603E−02 |
| 7 | −1.8119018E+03 | 1.1900936E+03 | −5.2008280E+02 | 1.3554746E+02 | −1.5921139E+01 |
| 8 | −2.5201468E+02 | 1.4805270E+02 | −5.9085565E+01 | 1.4410998E+01 | −1.6197166E+00 |
| 9 | 7.1163418E+01 | −3.5515189E+01 | 1.1787660E+01 | −2.3272228E+00 | 2.0638187E−01 |
| 10 | 5.8126369E+00 | −1.9877495E+00 | 4.4566491E−01 | −5.8878733E−02 | 3.4729033E−03 |
| 11 | −1.3530272E+00 | 4.2135372E−01 | −8.6912679E−02 | 1.0682775E−02 | −5.9134165E−04 |

TABLE 7

Example 4
f = 4.38, Bf = 0.81

| Si | Ri | Di | Ndj | vdj |
|---|---|---|---|---|
| 1 (aperture stop) | ∞ | −0.20 | | |
| * 2 | 1.5780 | 0.65 | 1.54488 | 54.87 |
| * 3 | −5.5484 | 0.05 | | |
| * 4 | 43.0000 | 0.31 | 1.63351 | 23.63 |
| * 5 | 3.1273 | 0.52 | | |
| * 6 | −23.7349 | 0.33 | 1.63351 | 23.63 |
| * 7 | 12.0186 | 0.28 | | |
| * 8 | −3.1242 | 1.01 | 1.54488 | 54.87 |
| * 9 | −1.1474 | 0.30 | | |
| * 10 | −2.9268 | 0.45 | 1.54488 | 54.87 |
| * 11 | 1.6899 | 0.31 | | |
| 12 | ∞ | 0.34 | 1.56700 | 37.80 |
| 13 | ∞ | 0.28 | | |
| 14 (imaging surface) | ∞ | | | |

* aspherical surface

TABLE 8

Example 4: Aspherical Surface Data

| Surface Number | KA | A3 | A4 | A5 | A6 |
|---|---|---|---|---|---|
| 2 | −1.7467056E−01 | −5.3116560E−02 | 4.9355381E−01 | −3.3247064E+00 | 2.0705444E+01 |
| 3 | −3.1578150E+01 | −6.7343416E−02 | 4.2104595E−01 | −7.7735971E−01 | −7.3795147E−01 |
| 4 | 2.0503035E−08 | −4.8285773E−03 | 8.9375546E−02 | −1.6881356E−01 | 5.3520389E+00 |
| 5 | 2.3396374E−01 | 6.2966079E−02 | −3.9838763E−01 | 1.4269881E+00 | −2.4436265E+00 |
| 6 | −1.0747270E+06 | −1.2274269E−01 | 5.1591978E−01 | −2.3965251E+00 | 4.0764520E+00 |
| 7 | 6.4934996E+01 | 8.4711794E−03 | −3.8352307E−01 | 2.4283318E+00 | −1.4145653E+01 |
| 8 | −1.9759307E−01 | −5.3099543E−02 | 1.4070140E−01 | 3.4814347E−01 | −3.8781465E+00 |
| 9 | −5.2185119E−01 | −3.6432294E−02 | 2.8864268E−01 | −5.0013615E−01 | 2.3963613E+00 |
| 10 | −2.1144206E+00 | −6.8601406E−02 | 3.0235716E−01 | −7.7033344E−01 | 1.8300827E+00 |
| 11 | 9.3229947E−02 | 1.4742360E−02 | −6.4198807E−01 | 1.0181693E+00 | −1.1976470E+00 |

| | A7 | A8 | A9 | A10 | A11 |
|---|---|---|---|---|---|
| 2 | −1.0773406E+02 | 4.1469676E+02 | −1.1511283E+03 | 2.3265080E+03 | −3.4558363E+03 |
| 3 | 4.4114101E+00 | −4.5711948E+00 | −1.9030956E+00 | 4.6328123E+00 | −6.0257669E−01 |
| 4 | −4.2983759E+01 | 1.8618436E+02 | −5.2603081E+02 | 1.0535385E+03 | −1.5466477E+03 |
| 5 | 9.4625508E−01 | 4.2159426E+00 | −6.3162309E+00 | 1.8949967E+00 | 6.1252745E−02 |
| 6 | −1.4720642E+00 | −5.9227975E+00 | 8.8615872E+00 | −1.9235179E+00 | −2.7759126E+00 |
| 7 | 5.7077279E+01 | −1.6574719E+02 | 3.5345618E+02 | −5.5578122E+02 | 6.4208056E+02 |
| 8 | 1.5207278E+01 | −3.9220165E+01 | 7.2940966E+01 | −1.0003591E+02 | 1.0121973E+02 |
| 9 | −8.7947488E+00 | 2.0292226E+01 | −3.2580762E+01 | 3.8293573E+01 | −3.3288895E+01 |
| 10 | −3.7770434E+00 | 6.0470378E+00 | −7.1864414E+00 | 6.2262795E+00 | −3.8873171E+00 |
| 11 | 1.5634491E+00 | −2.0978932E+00 | 2.2571046E+00 | −1.7740550E+00 | 1.0004228E+00 |

TABLE 8-continued

Example 4: Aspherical Surface Data

| | A12 | A13 | A14 | A15 | A16 |
|---|---|---|---|---|---|
| 2 | 3.7540952E+03 | −2.9062550E+03 | 1.5160992E+03 | −4.7608275E+02 | 6.7738730E+01 |
| 3 | 3.5588444E+00 | −1.2503176E+01 | 1.2359142E+01 | −4.9202696E+00 | 6.3312920E−01 |
| 4 | 1.6649007E+03 | −1.2783936E+03 | 6.6042111E+02 | −2.0471387E+02 | 2.8619058E+01 |
| 5 | 3.8365637E+00 | −3.8472352E+00 | −9.0540861E−01 | 2.5959130E+00 | −8.5270172E−01 |
| 6 | −2.4210174E+00 | 6.9729391E+00 | −4.3922374E+00 | 9.1681448E−01 | −7.7163898E−02 |
| 7 | −5.3707499E+02 | 3.1584491E+02 | −1.2359148E+02 | 2.8829983E+01 | −3.0412171E+00 |
| 8 | −7.4708891E+01 | 3.9298635E+01 | −1.4044570E+01 | 3.0678746E+00 | −3.0780122E−01 |
| 9 | 2.1095620E+01 | −9.4257519E+00 | 2.8010119E+00 | −4.9526690E−01 | 3.9346340E−02 |
| 10 | 1.7230125E+00 | −5.2755580E−01 | 1.0590284E−01 | −1.2527048E−02 | 6.6148335E−04 |
| 11 | −4.0107087E−01 | 1.1182906E−01 | −2.0653092E−02 | 2.2729718E−03 | −1.1261623E−04 |

TABLE 9

Reference Example 5
f = 4.76, Bf = 1.33

| Si | Ri | Di | Ndj | vdj |
|---|---|---|---|---|
| 1 (aperture stop) | ∞ | −0.19 | | |
| * 2 | 1.5636 | 0.52 | 1.54488 | 54.87 |
| * 3 | −5.5484 | 0.05 | | |
| * 4 | 43.0019 | 0.31 | 1.63351 | 23.63 |
| * 5 | 2.8667 | 0.54 | | |
| * 6 | −43.1588 | 0.31 | 1.63351 | 23.63 |
| * 7 | 8.3287 | 0.28 | | |
| * 8 | −2.4781 | 1.03 | 1.54488 | 54.87 |
| * 9 | −1.3060 | 0.30 | | |
| * 10 | 8.6543 | 0.35 | 1.54488 | 54.87 |
| * 11 | 1.4376 | 0.61 | | |
| 12 | ∞ | 0.34 | 1.56700 | 37.80 |
| 13 | ∞ | 0.51 | | |
| 14 (imaging surface) | ∞ | | | |

* aspherical surface

TABLE 10

Reference Example 5: Aspherical Surface Data

| Surface Number | KA | A3 | A4 | A5 | A6 |
|---|---|---|---|---|---|
| 2 | −2.2106787E−01 | −4.7479009E−02 | 4.9472455E−01 | −3.2673665E+00 | 2.0657354E+01 |
| 3 | −5.0205345E+01 | −6.2295247E−02 | 4.7552775E−01 | −7.6325443E−01 | −8.2407301E−01 |
| 4 | 9.4975404E+01 | −1.1004176E−01 | 1.1850420E−01 | −3.6141071E−01 | 5.4956790E+00 |
| 5 | 4.9596349E−02 | 3.7579011E−02 | −4.2168410E−01 | 1.2522031E+00 | −2.3075150E+00 |
| 6 | −6.5005665E+06 | −9.6003061E−02 | 4.1412480E−01 | −2.2868990E+00 | 3.8390546E+00 |
| 7 | 6.1807516E+01 | 2.5319802E−02 | −3.9245775E−01 | 2.3880922E+00 | −1.4258939E+01 |
| 8 | 4.7932031E−02 | −1.7538014E−02 | 1.4852538E−01 | 3.8518716E−01 | −3.7759798E+00 |
| 9 | −5.4621110E−01 | −3.5894889E−02 | 3.7282934E−01 | −6.1413296E−01 | 2.4652345E+00 |
| 10 | 3.7785408E−01 | −5.7090961E−02 | 1.7278362E−01 | −7.1388819E−01 | 1.8420555E+00 |
| 11 | 1.3172581E−01 | 3.9518774E−02 | −7.6112880E−01 | 1.0890049E+00 | −1.2032001E+00 |

| | A7 | A8 | A9 | A10 | A11 |
|---|---|---|---|---|---|
| 2 | −1.0771388E+02 | 4.1471883E+02 | −1.1511174E+03 | 2.3265038E+03 | −3.4558374E+03 |
| 3 | 4.4728832E+00 | −4.5010214E+00 | −1.8948837E+00 | 4.6005521E+00 | −6.3863052E−01 |
| 4 | −4.2982674E+01 | 1.8614910E+02 | −5.2603500E+02 | 1.0535491E+03 | −1.5466410E+03 |
| 5 | 9.3337887E−01 | 4.1412715E+00 | −6.3553808E+00 | 1.9013566E+00 | 1.1985057E−01 |
| 6 | −1.3473772E+00 | −5.8290281E+00 | 9.0843136E+00 | −2.0271869E+00 | −3.0400988E+00 |
| 7 | 5.7256139E+01 | −1.6577350E+02 | 3.5347866E+02 | −5.5582586E+02 | 6.4212125E+02 |
| 8 | 1.4875115E+01 | −3.9123672E+01 | 7.3013593E+01 | −1.0005208E+02 | −1.0135944E+02 |
| 9 | −8.7946384E+00 | 2.0277723E+01 | −3.2585948E+01 | 3.8299017E+01 | −3.3287007E+01 |
| 10 | −3.7799211E+00 | 6.0445732E+00 | −7.1872859E+00 | 6.2265456E+00 | −3.8872444E+00 |
| 11 | 1.5575984E+00 | −2.0989216E+00 | 2.2578305E+00 | −1.7737522E+00 | 1.0006571E+00 |

| | A12 | A13 | A14 | A15 | A16 |
|---|---|---|---|---|---|
| 2 | 3.7541017E+03 | −2.9062541E+03 | 1.5160996E+03 | −4.7608915E+02 | 6.7733294E+01 |
| 3 | 3.5440722E+00 | −1.2498179E+01 | 1.2372184E+01 | −4.9116116E+00 | 6.2806202E−01 |
| 4 | 1.6648914E+03 | −1.2784153E+03 | 6.6040109E+02 | −2.0471803E+02 | 2.8643522E+01 |
| 5 | 3.8732049E+00 | −3.8458387E+00 | −9.9640353E−01 | 2.5284677E+00 | −9.0486274E−01 |
| 6 | −2.5324898E+00 | 7.0799512E+00 | −4.2806139E+00 | 1.2803285E+00 | −4.8032618E−01 |
| 7 | −5.3717061E+02 | 3.1597882E+02 | −1.2365892E+02 | 2.8925276E+01 | −3.1308707E+00 |
| 8 | −7.4783387E+01 | 3.9197691E+01 | −1.3916340E+01 | 2.9295298E+00 | −2.2904129E−01 |
| 9 | 2.1095256E+01 | −9.4263319E+00 | 2.8009064E+00 | −4.9514387E−01 | 3.9331724E−02 |
| 10 | 1.7230120E+00 | −5.2753498E−01 | 1.0590090E−01 | −1.2532584E−02 | 6.6277847E−04 |
| 11 | −4.0126070E−01 | 1.1181827E−01 | −2.0643608E−02 | 2.2764249E−03 | −1.1327540E−04 |

TABLE 11

| | | | Values Related to Conditional Formulae | | | |
|---|---|---|---|---|---|---|
| Formula | Condition | Example 1 | Reference Example 2 | Example 3 | Example 4 | Reference Example 5 |
| (1) | f/f1 | 1.45 | 1.25 | 1.59 | 1.88 | 2.07 |
| (2) | f/f3 | −0.25 | −0.19 | −0.24 | −0.35 | −0.43 |
| (3) | f/f5 | −1.95 | −1.87 | −1.98 | −2.30 | −1.48 |
| (4) | f/f2 | −0.77 | −0.65 | −0.85 | −0.82 | −0.98 |
| (5) | f/f4 | 2.06 | 2.03 | 1.95 | 1.55 | 1.23 |
| (6) | vd3 | 23.63 | 23.63 | 25.48 | 23.63 | 23.63 |

What is claimed is:

1. An imaging lens consisting of five lenses, including:
a first lens of a biconvex shape;
a second lens of a meniscus shape having a concave surface toward the image side in the vicinity of the optical axis;
a third lens of a biconcave shape;
a fourth lens of a meniscus shape having a convex surface toward the image side; and
a fifth lens of a biconcave shape having at least one inflection point on the surface thereof toward the image side, provided in this order from the object side, the imaging lens satisfying the conditional formulae below:

$$1.45 \leq f/f1 < 3 \tag{1-3}$$

$$-0.6 < f/f3 \leq -0.24 \tag{2-2}$$

wherein f is the focal length of the entire system, f1 is the focal length of the first lens, and f3 is the focal length of the third lens.

2. An imaging lens as defined in claim 1 that further satisfies the conditional formula below:

$$-3 < f/f5 < -1.2 \tag{3}$$

wherein f5 is the focal length of the fifth lens.

3. An imaging lens as defined in claim 1, wherein:
the second lens has a negative refractive power.

4. An imaging lens as defined in claim 1 that further satisfies the conditional formula below:

$$-2 < f/f2 < -0.4 \tag{4}$$

wherein f2 is the focal length of the second lens.

5. An imaging lens as defined in claim 1, wherein:
the fourth lens has a positive refractive power.

6. An imaging lens as defined in claim 1 that further satisfies the conditional formula below:

$$1 < f/f4 < 2.5 \tag{5}$$

wherein f4 is the focal length of the fourth lens.

7. An imaging lens as defined in claim 1 that further satisfies the conditional formula below:

$$vd3 < 30 \tag{6}$$

wherein vd3 is the Abbe's number of the third lens with respect to the d line.

8. An imaging lens as defined in claim 1 that further satisfies the conditional formula below:

$$1.45 \leq f/f1 < 2.5 \tag{1-4}$$

9. An imaging lens as defined in claim 1 that further satisfies the conditional formula below:

$$-0.5 < f/f3 \leq -0.24 \tag{2-3}$$

10. An imaging lens as defined in claim 1 that further satisfies the conditional formula below:

$$-2.5 < f/f5 < -1.3 \tag{3-1}$$

wherein f5 is the focal length of the fifth lens.

11. An imaging lens as defined in claim 1 that further satisfies the conditional formula below:

$$-1.5 < f/f2 < -0.5 \tag{4-1}$$

wherein f2 is the focal length of the second lens.

12. An imaging lens as defined in claim 1 that further satisfies the conditional formula below:

$$1.1 < f/f4 < 2.3 \tag{5-1}$$

wherein f4 is the focal length of the fourth lens.

13. An imaging lens as defined in claim 1 that further satisfies the conditional formula below:

$$vd3 < 26 \tag{6-1}$$

wherein vd3 is the Abbe's number of the third lens with respect to the d line.

14. An imaging lens as defined in claim 1 that further satisfies the conditional formula below:

$$1.45 \leq f/f1 < 2.2 \tag{1-5}$$

wherein f1 is the focal length of the first lens.

15. An imaging apparatus equipped with the imaging lens defined in claim 1.

* * * * *